United States Patent
Mazur et al.

(10) Patent No.: US 9,971,228 B2
(45) Date of Patent: May 15, 2018

(54) DIRECT ENTANGLED TRIPLET-PHOTON SOURCES AND METHODS FOR THEIR DESIGN AND FABRICATION

(71) Applicant: President And Fellows of Harvard College, Cambridge, MA (US)

(72) Inventors: Eric Mazur, Concord, MA (US); Christopher Courtney Evans, Ithica, NY (US); Michael Gerhard Moebius, Somerville, MA (US); Orad Reshef, Cambridge, MA (US); Sarah E. Griesse-Nascimento, Cambridge, MA (US)

(73) Assignee: President And Fellows of Harvard College, Cambridge, MA (US)

( * ) Notice: Subject to any disclaimer, the term of this patent is extended or adjusted under 35 U.S.C. 154(b) by 0 days. days.

(21) Appl. No.: 15/130,482

(22) Filed: Apr. 15, 2016

(65) Prior Publication Data
US 2016/0306258 A1    Oct. 20, 2016

Related U.S. Application Data

(63) Continuation-in-part of application No. 14/529,906, filed on Oct. 31, 2014, now Pat. No. 9,470,956.

(60) Provisional application No. 61/898,190, filed on Oct. 31, 2013.

(51) Int. Cl.
| | |
|---|---|
| G02F 1/295 | (2006.01) |
| G02B 6/00 | (2006.01) |
| G02F 1/35 | (2006.01) |
| G02F 1/365 | (2006.01) |
| G02F 1/39 | (2006.01) |

(Continued)

(52) U.S. Cl.
CPC .............. *G02F 1/353* (2013.01); *G02F 1/355* (2013.01); *G02F 1/3544* (2013.01); *G02F 1/365* (2013.01); *G02F 1/39* (2013.01); *G02F 1/395* (2013.01); *G02F 1/3501* (2013.01); *G02F 1/3526* (2013.01); *G02F 2001/354* (2013.01); *G02F 2001/3542* (2013.01); *G02F 2202/36* (2013.01); *H04B 10/70* (2013.01)

(58) Field of Classification Search
CPC ........ G02F 1/353; G02F 1/395; G02F 1/3536; G02F 1/3544; G02F 1/355; G02F 1/365; G02F 2001/354; G02F 2001/3542
USPC ...................... 385/5, 122; 359/326, 328–330
See application file for complete search history.

(56) References Cited

PUBLICATIONS

"Phase-matched third-order frequency generation in TiO2 rutile single crystal," by Gravier et al, Conference of Lasers and Electro-Optics, paper CTuR2, 2006.*

(Continued)

*Primary Examiner* — Robert Tavlykaev
(74) *Attorney, Agent, or Firm* — Reza Mollaaghaaba; Thomas J. Engellenner; Pepper Hamilton LLP

(57) ABSTRACT

In one aspect, a device for generating triplet photons is disclosed, which includes a waveguide extending from a proximal end for receiving pump radiation to a distal end through which triplet photons generated via nonlinear interaction of the pump radiation with the waveguide exit the waveguide, where the waveguide is configured such that the triplet photons generated within the waveguide reach its distal end at a rate in a range of about 0.05 triplet photons/second/mW and 0.3 triplet photons/second/mW, e.g., in a range of about 0.1 triplet photons/second/mW to about 0.2 triplet photons/second/mW.

29 Claims, 33 Drawing Sheets

(51) Int. Cl.
G02F 1/355 (2006.01)
H04B 10/70 (2013.01)

(56) References Cited

PUBLICATIONS

"Generation of correlated photons in controlled spatial modes by downconversion in nonlinear waveguides," by Banaszek et al, Optics Letters, vol. 26, No. 17, pp. 1367-1369, 2001.*
"Experimental characterization of three-wave mixing in a multimode nonlinear KTiOPO4 waveguide," by Karpinski et al, Applied Physics Letters, vol. 94, paper 181105, 2009.*
Bradley, Jonathan, D.B. et al. "Submicrometer-Wide AMorphous and Polycrystalline Anatase TiO2 Waveguides for Microphotonic Devices" Optics Express, vol. 20, No. 21, pp. 23821-23831, Oct. 8, 2012.
Shalm, L.K. et al. "Three-Photon Energy-Time Entanglement", Nature Physics—Letters, DOI: 10.1038/NPHYS2492, pp. 1-4: Nov. 25, 2012.
Loock, Peter Van et al, "Etecting Genuine Multipartite Continous-Variable Entaglement", The Amercian Physical Society—Physical Review A 67, pp. 052315-1-052315-13 (2003).
Choy, Jennifer T. et al. "Integrated TiO2 Resonators for Visible Photonics", Optical Society of America, Optics Letters; vol. 37, No. 4, pp. 539-541 Feb. 15, 2012.
Evans, Christopher C. et al. "Spectral Broadening in Anatase Titanium Dioxide Waveguides at Telecommunication and Near-Visible Wavelengths", Optics Express, vol. 21, No. 15, pp. 18582-18591 Jul. 29, 2013.
Bencheikh, Kamel et al. "Triple Photons: A Challenge in Nonlinear and Quantum Optics", C.R. Phsique 8 pp. 206-220 (2007).
Richard, S. et al. "Semiclassical Model of Triple Photons Generation in Optical Fibers", Optical Society of America-Optics Letters, vol. 36, No. 15, pp. 3000-3002 Aug. 1, 2011.
Eisaman, M.D. et al. "Invited Review Article: Single-Photon Sources and Detectors", REview of Scientific Instruments (AIP); Rev. Sci. Instrum. 82, pp. 071101-071101-25 (2011).
Ladd, T.D. et al. "Quantum Computers" Nature—Reviews, vol. 46414, pp. 45-53 (Mar. 2010).
Evans, Christopher C. et al. "Mixed Two- and Three-Photon Absorption in Bulk Rutile (TiO2) Around 800 NM", Optics Express, vol. 20, No. 3, pp. 3118-3128, Jan. 30, 2012.
Evans, Christopher C. et al. "Multimode Phase-Matched Third-Harmonic Generation in Sub-Micrometer-Wide Anatase TiO2 Waveguies", Optics Express, vol. 232, No. 6, pp. 7832 7841, Mar. 23, 2015.
Moimer, Klaus "Monte Carlo Wave-Function Method in Quantum Optics", J. Opt. Soc. Am. B/vol. 10, No. 3, pp. 524-538 (Mar. 1993).
Sheik-Bahae, M. et al. "Dispersion and Band-Gap Scaling of the Electronic Kerr Effect in Solids Associated With Two-Photon Absorption" The American Physical Society, Physical Review Letters, vol. 65. No. 1 pp. 96-99, Jul. 2, 1990.
Raymer, M.G. et al. "Entangle Photon-Pair Two-Dimensional Fluorsecence Spectroscopy (EPP-2DFS)", American Chemical Society, J. Phys. Chem B 117, pp. 15559-15575 (2013).
Yuan, Zhen-Sheng et al. "Entangled Photons and Quantum Communication" Physics Reports, 497 pp. 1-40 (2010).
Soljacic, Marin and Joannopoulos, J.D. "Enhancement of Nonlinear Effects Using Photonic Crystals", Nature Publishing Group—Nature Materials, vol. 3, pp. 211 219 (Apr. 2004).
Reshef, Orad et al. "Polycrystalline Anatase Titanium Dioxide Microring Resonators With Negative Thermo-Optic Coefficient", Jounal of the Optical Society of America B, vol. 32, No. 11, pp. 2288-2293 (Nov. 2015).
Bufetov, I.A. et al. "Ultraviolet-Light Generation in Nitrogen-Doped Silica Fiber", Optical Society of America—Optical Letters, vol. 22, No. 18 pp. 1394-1396, Sep. 15, 1997.

Corona, Maria et al. "Third-Order Spontaneous Parametric Down-Conversion in Thin Optical Fibers as a Photon-triplet Source", American Physical Society—Physical Review A 84, pp. 033823-1 033823-13 (2011).
Lee, Timothy et al. Resonantly Enhanced Third Harmonic Generation in Microfiber Loop Resonators; J. Opt. Soc. Am. B, vol. 30, No. 3 pp. 505 511 (Mar. 2013).
Plenio, M.D. and Knight, P.L. "The Quantum-Jump Approach to Dissipative Dynamics in Quantum Optics", Review of Modern Physics, vol. 70, No. 1 (Jan. 1998).
Chekhova, M.V. and Ivanova, O.A. "Spectral Properties of Three-Photon Entangled States Generated via Three-Photon Parametric Down-Conversion in a X(3) Medium" The American Physical Society—Physical Review A, 72, pp. 023818-1 023818-8 (2005).
Taylor, Michae A. et al. "Biological Measurement Beyond the Quantum Limit" Nature Photonics, vol. 7, pp. 229 233 (Mar. 2013).
Krapick, Stephan and Silberhorn, Christine "Analysis of Photon Triplet Generation in Pulsed Cascaded Parametric Down-Conversion Sources", arXiv:1506.07655v1 [quant-ph] pp. 1-12 (Jun. 25, 2015).
Dousse, Adrien et al. "Ultrabright Source of Entangled Photon Pairs" Nature—vol. 466 pp. 217 220, Jul. 8, 2010.
Shih, Yanhua "Entangled Biophoton Source—Property and Preparation", Rep. Prog. Phys. 66, pp. 1009-1044 (2003).
Lugiato, L.A. et al. "Quantum Imaging" arXiv:quant-ph/0203046v1, pp. 1 27 (Mar. 11, 2002).
Zhu, Zhaoming and Brown, G. Thomas "Full-Vectorial Finite-Difference Analysis of Microstructured Optical Fibers" Optics Express, vol. 10, No. 17, pp. 853 864 Aug. 26, 2002.
Das, Susanta Kumar et al. "Highly Efficient THG in TiO2 Nanolyers for Third-Order Pulse Characterization" Optics Express, vol. 19, No. 18, pp. 16985-16995, Aug. 29, 2011.
Felbinger, Timo et al. "Oscillation and Generation of Nonclassical STates in THree-Photon Down-Conversion" The American Physical Society, Physical Review Letters, vol. 80, No. 3, pp. 492-495 Jan. 19, 1998.
Corocran, B. et al. "Green Ligh Emission in Silicon Through Slow-Light Enhanced Third-Harmonic Generation in Photonic-crystal Waveguides", Nature Photonics, vol. 3, pp. 206-2010, (2009).
Giovanneti, Vittorio et al. "Advances in Quantum Metrology", Nature Photonics, vol. 5 (Apr. 2011).
Coelho, A.S. et al. "Three-Color Entanglement", Science, vol. 325 pp. 823-826 Nov. 6, 2009.
Lin, Q. et al. "Photon-Pair Generation in Optical Fibers Through Four-Wave Mixing: Role of Raman Scattering and Pump Olarization", The American Phsical Society, Physical Review A, 75 pp. 023803-1-023803-19 (2007).
Evans, C. Christopher et al. "Low-Loss Titanium Dioxide Waveguides and Resonators Using a Dielectric Lift-Off Fabrication Process" Optics Express, vol. 23, No. 9, pp. 11160-11168, Apr. 21, 2015.
Watanabe, Yutchi et al. "Measurement of nonlinear Absorption and Refraction in Titanium Dioxide Single Crystal by Using a Phase Distortion Method" Applied Physics Letters, vol. 66, No. 25, pp. 3431-3432 Jun. 19, 1995.
O'Brien L. Jeremy et al. "Hototonic Quantum Technologies", Nature Photonics, vol. 3 pp. 687-695 (2009).
Hong, C.K. and Mandel, L. "Theory of Parametric Frequency Down Conversion of Light", Physical Review A, vol. 31, No. 4, pp. 2409-2418 (Apr. 1985).
Dell'Anno, F. et al. "Continuous-Variable Quantum Teleportation With Non-Gaussian Resoures", The American Physical Society—Phusical Review A, 76, pp. 022301-1-022301-11 (2007).
Preston, Kyle et al. "Pllysilicon Photonioc Resonators for Large-Scale 3D Integration of Optical Networks", Optics Express, vol. 15, No. 25 pp. 17283-17290, Dec. 10, 2007.
Helt, L.G. and Steel, M.J. "Sontaneous Paramettric Downcoversion in Waveguides: What's Loss Got to Do With It?", arXiv:1407.4219fv1 [quant-ph], pp. 1 13, Jul. 16, 2014.
Hubel et al. "Direct Generation of Photon Triplets Using Cascaded Photon-Pair Source", Supplementary Information; doi:10.1038/nature 09175, pp. 601-603 Jul. 29, 2010.

(56) References Cited

OTHER PUBLICATIONS

Bennett, Charles H. et al. "Quantum Information and Computation", Nature, vol. 404, pp. 247-255 (Mar. 16, 2000).

Bradley, Jonathan D.B. et al. "Submicrometer-Wide Amorphous and Polycrystalline Anatase TiO2 Waveguides for Microphotonic Devices", Optics Express, vol. 20, No. 21, pp. 23821-23831 Oct. 8, 2012.

Choy, Jennifer T. et al. "Integrated Ti02 Resonators for Visible Photonics", Optics Letters, vol. 37, No. 4 pp. 539-541 Feb. 15, 2012.

Corona, Maria et al. "Experimental Proposal for the Generation of Entangled Photon Triplets by Thrid-Order Sponteaneous Parametric Downconversion in Optical Fibers", Optics Letters, vol. 36, No. 2 pp. 190-192 Jan. 15, 2011.

Foster, M.A. et al. "Optimal Waveguide Dimensions for Nonlinear Interactions", Optics Express, vol. 12, No. 13, pp. 2880-2887 Jun. 28, 2004.

Foster, Mark a. et al. "Nonlinear Optics in Photonic Nanowires", Optics Express, vol. 16, No. 2 pp. 1300-1320, Jan. 21, 2008.

Greenberger, Daniel M. et al. "Bells Theorem without Inequalities", Am. J. Phys. 58, pp. 1131-1143 Dec. 1990.

Herzog, T.J. et al. "Frustrated Two-Photon Creation via Interference", Physical Review Letters, vol. 72, No. 5 pp. 629-632 Jan. 31, 1994.

Hillery, Mark et al. "Quantum Secret Sharing", Phsical Review A., vol. 59, No. 3 pp. 1829-1834 Mar. 1999.

Hubel, H. et al., "Direct Generation of Photon Triplets Using Cascaded Photon-Pair Sources", Nature 466 2010.

Levy, JAcob S. et al. "Harmonic Generation in Silicon Nitride Ring Resonators" Optics Express, vol. 19, No. 12, pp. 11415-11421 Jun. 6, 2011.

Martin, N. et al. "Characterizations of Titanium Oxide Films Prepared by Radio Frequency Magnetron Sputtering" Thin Solid Films 287, pp. 154-163 1996.

Martin, Nicolas et al. "Miscrostructure Modification of Amorphous Titanium Oxide Thin Films During Annealing Treatment", Thin Solid Films 300,k pp. 113-121 1997.

Jeronimo-Moreno, Y. et al. "Theory of Cavity-Enhanced Spontaneous Parametric Downconversion", Laser Physics Rev. vol. 20, pp. 1221-1233 2010.

Najafi, F. et al. "Membrane-Integrated Superconducting Nanowire Single-Photon Detectors", CLEO 2013.

Richard, S. et al. "Semiclassical Model of Triple Photons Generation in Optical Fibers" Optics Letters, vol. 36, No. 15, pp. 3000-3002 Aug. 1, 2011.

Tanzilli, S. et al. "Highly Efficient Photon-Pair Source Using a Periodically Poled Lithium Niobate Waveguide", Electronics Letters 37, pp. 26-28 2001.

Yan, Li et al. "Bragg-Grating-Enhanced Narrowband Spontaneous Parametric Downconversion", Optics Express vol. 18, No. 6, pp. 5957-5963 Mar. 15, 2010.

Yang, Zhenshan et al. "Enhanced Second-Harmonic Generation in A1GaAs Microring Resonators", Optics Letters, vol. 32, No. 7, pp. 826-828 Apr. 1, 2007.

Bi, Zhuan-Fang et al. "High-Efficiency Second-Harmonic Generation in Doubly-Resonant x(2) Microring Resonators", Optics Express vol. 20, No. 7, pp. 7526-7543 Mar. 26, 2012.

Graver et al., "Third Order Frequency Generation in TiO2 Rutile and KTiOPO4", Optical Materials vol. 30, pp. 33 36 2007.

Chekhova et al, "Spectral Properties of Three-Photon Entangled States Generated via Three-Photon Parametric Down-Conversion in a x(3) Medium", Physical Review, A 72 pp. 023818-1-023818-8 2005.

Preston, Kyle et al. "Polysilicon Photonic Resonators for Large-Scale 3D Integration of Optical Networks", Optics Express, vol. 15, No. 25, pp. 17283-17290, Dec. 10, 2007.

Raymer, M.G. et al. Entangled Photon-Pair Two-Dimensional Fluorescence Spectroscopy (EPP-2DFS; J. Phys. Chem. B., 117, pp. 15559-15575 (2013).

Soljacic, Marin and Joannopoulos, J.D. "Enhancement of Nonlinear Effects Using Photonic Crystals", Nature Materials, vol. 3, pp. 211-219 (Apr. 2004).

Zhu, Zhaoming and Brow, Thomas G. "Full-Vectorial Finite-Difference Analysis of Miscrostructured Optical Fibers", Optics Express, vol. 10, No. 17, pp. 853-864, Aug. 26, 2002.

Boyd, Robert W. "Nonlinear Optics", Elsevier, Burlington, MA USA, 3rd ed. (2008).

\* cited by examiner

US 9,971,228 B2

DIRECT ENTANGLED TRIPLET-PHOTON SOURCES AND METHODS FOR THEIR DESIGN AND FABRICATION

RELATED APPLICATIONS

The present application claims priority as a continuation-in-part application to U.S. patent application Ser. No. 14/529,906 entitled "Direct Entangled Triplet-Photon Sources And Methods For Their Design And Fabrication," filed on Oct. 31, 2014, which claims priority to a provisional patent application having Application No. 60/898,190 filed on Oct. 31, 2013. Both of these applications are herein incorporated by reference in their entirety.

FEDERALLY SPONSORED RESEARCH

This invention was made with Government support under grants ECCS-1201976 and ECCS-0901469 awarded by National Science Foundation (NSF). The Government has certain rights in the invention.

BACKGROUND

The present teachings are generally directed to devices and methods for entangled photon triplet generation, and in particular to on-chip integrated sources for generating direct entangled photon triplets.

An efficient triplet-photon source can have a variety of applications ranging from fundamental experiments in quantum optics to strict tests of quantum theory to revolutionary applications in secure quantum communication and computation. Quantum entanglement, where multiple particles share a joined quantum state, is the basis for many of these applications. Secure two-party quantum communication links using optical fiber (at telecommunications wavelengths, e.g. $\lambda=1550$ nm) have recently been commercialized using pairs of entangled photons. The challenge for realizing a multiparty quantum network is to entangle three or more photons, including the ability to form a Greenberger-Horne-Zeilinger (GHZ) state.

The production of direct entangled photon triplets has, however, proven to be exceedingly difficult. Although there are different ways to entangle photons (e.g., using post-selection methods), direct entangled photon triplet production differs in that the photon triplets originate from the same original photon and are generated in the same event.

Current methods for entangled photon triplet generation have primarily focused on adapting photon pair sources. For example, in one process known as cascaded spontaneous parametric down-conversion (SPDC), a single photon splits into two photons through SPDC (a $\chi^{(2)}$ nonlinear process) and one of those photons splits a second time, forming a triplet. SPDC can achieve conversion pair efficiencies in the range of $10^{-9}$-$10^{-6}$ (which translates to triplet efficiencies of $10^{-18}$-$10^{-12}$ using cascaded SPDC). Direct triplet production through a $\chi^{(3)}$ process, known as third-order spontaneous parametric down-conversion (TOSPDC), whereby one photon is annihilated to produce a photon triplet, is less explored due to extraordinarily low efficiency in bulk materials. The small efficiency is due to low $\chi^{(3)}$ nonlinearities (compared to $\chi^{(2)}$ processes), poor photon confinement, and difficulties achieving momentum conservation (phase matching) between disparate wavelengths.

Accordingly, there is a need for enhanced sources and methods for generating entangled photon triplets.

SUMMARY

In one aspect, a device for generating entangled photon triplets is disclosed, which includes a waveguide extending from a proximal end for receiving pump radiation to a distal end through which entangled photon triplets generated via nonlinear interaction of the pump radiation with the waveguide exit the waveguide, where the waveguide is configured such that the entangled photon triplets generated within the waveguide reach its distal end at a rate in a range of about 0.05 triplet photons/second/mW and 0.3 triplet photons/second/mW, e.g., in a range of about 0.1 triplet photons/second/mW to about 0.2 triplet photons/second/mW.

In some embodiments, the waveguide is configured to provide phase matching between at least one propagating mode of the pump radiation and at least one propagating mode suitable for generation of the entangled photon triplets. For example, the waveguide can be configured to provide phase matching between a (non-fundamental) higher-order propagating mode of the pump radiation and at least one mode suitable for the propagation of the entangled photon triplets.

In some embodiments, the waveguide can include a core and at least one cladding. In some such embodiments, the waveguide can exhibit values of core and cladding thickness, height, etch fraction, sidewall angle and length that result in the waveguide supporting the above rates for the entangled photon triplets generated within the waveguide that reach its distal end. By way of example, any of the thickness and height of the waveguide can be in a range of about 100 nm to about 2000 nm, e.g., in a range of about 200 nm to about 1000 nm, or in a range of about 200 nm to about 500 nm. By way of example, the etch fraction of the waveguide (fully etched) can be in a range of about 0.25 to about 1, e.g., in a range of about 0.5 to about 1, and the sidewall angle of the waveguide can be in a range of about 45 degrees to about 90 degrees. Further, in some embodiments, the length of the waveguide can be in a range of about 100 micrometers to about 10 cm, e.g., in a range of about 100 micrometers to about 1 mm, or in a range of about 200 micrometers to about 500 micrometers.

In some embodiments, the length of the waveguide is selected to be equal to or less than ($L_{opt}$) defined by the following relation:

$$L_{opt} = \left(\frac{1}{\alpha_p - 3\alpha_s}\right) \ln\left(\frac{\alpha_p}{3\alpha_s}\right)$$

wherein $\alpha_p$ and $\alpha_s$ denote loss coefficients (e.g., due to absorption and/or scattering) for the pump radiation photons and the entangled photon triplets within said waveguide, respectively.

Further, in some embodiments, the length of the waveguide can be greater than a length ($L_{min}$) satisfying the following relation:

$$\Delta_{PPM} = \sqrt{\frac{4\pi}{L_{min}|D_s|}}$$

wherein $\Delta_{PPM}$ denotes the bandwidth of entangled photon triplets at phase matching point and $$D_s = \frac{\partial^2 k_s}{\partial^2 \omega_s}$$

evaluated at $\omega_s = \omega_s^0$ is the group velocity dispersion (GVD) of the entangled photon triplets in their respective mode at the phase matching point and $k_s$ is the propagation constant of the triplets in their respective mode.

In some embodiments, the waveguide core can include any of anatase $TiO_2$, amorphous $TiO_2$, brookite $TiO_2$, rutile $TiO_2$, silicon nitride, diamond, silicon carbide, strontium titanate, or zinc oxide. By way of example, in some embodiments, the waveguide core can include polycrystalline, anatase $TiO_2$.

In some embodiments, the waveguide cladding can include any of $SiO_2$, CYTOP, SU-8, or other low-index polymers, aluminum oxide, sapphire, or air.

In some embodiments, the waveguide core can include a polycrystalline material. By way of example, the polycrystalline material can have grain sizes equal to or less than about 50 nm, e.g., in a range of about 10 nm to about 50 nm, or less than about $\frac{1}{5}^{th}$ of the pump wavelength in order to minimize scattering losses.

The waveguide can have a variety of different cross-sectional shapes. By way of example, the waveguide can have a circular or a non-circular cross-sectional shape, such as a rectangular cross sectional shape.

In a related aspect, a method of generating direct entangled photon triplets is disclosed, which includes introducing pump radiation into a waveguide configured to provide phase matching between a higher-order mode of the pump radiation and at least one mode suitable for propagation of direct entangled photon triplets generated as a result of a non-linear interaction between the pump radiation and the waveguide, wherein the waveguide is configured such that the entangled photon triplets are generated within the waveguide and reach said distal end at a rate in a range of about 0.05 triplet photons/second/mW and 0.3 triplets/second/mW, e.g., in a range of about 0.05 to about 0.2 triplet photons/second/mW.

In the above method, the rate at which pump photons is applied to the waveguide is less than a threshold as defined by the following relation:

$$N_P < \sqrt{\frac{\rho_T}{\rho_{fl}^3 \Delta \tau_{correlation}^2}},$$

where $\rho_T$ and $\rho_{fl}$ represent, respectively, the rate at which pump photons are converted to photon triplets and fluorescence photons, and wherein $$\Delta \tau = D_s \times L \times \Delta \lambda_s,$$

where $D_s$ denotes the group velocity dispersion of the waveguide mode in which the entangled photon triplets propagate, L is the length of the waveguide, and $\Delta \lambda_s$ is the spectral bandwidth associated with the entangled photon triplets.

In a related aspect, a method of designing a waveguide for generating entangled photon triplets is disclosed, which includes selecting a material for the waveguide core and one or more claddings, if any. The method further includes the steps of calculating, for each of a plurality of sets of waveguide geometrical parameters, a pump mode and a triplet photon mode having the lowest phase mismatch and a non-zero effective nonlinearity ($\gamma$) and calculating, for each of said mode pairs, a figure-of-merit (F) according to the following relation:

$$F = \frac{\gamma^2}{\delta_s}$$

where $\gamma$ is the effective nonlinearity associated with the pump and the triplet photon modes and $\delta_s$ is the bandwidth of the entangled photon triplets. The method also includes selecting mode pairs, and corresponding waveguide geometrical parameters, for which said figure-of-merit exceeds a predefined threshold.

In the above method, the geometrical parameters of the waveguide can include any of width, height, thickness, etch depth and sidewall angle of the waveguide. The above method can further include selecting the waveguide core material to be any of anatase $TiO_2$, amorphous $TiO_2$, brookite $TiO_2$, rutile $TiO_2$, silicon nitride, diamond, silicon nitride, silicon carbide, strontium titanate, or zinc oxide. The cladding material of the waveguide can be selected to be any $SiO_2$, CYTOP, SU-8, other low-index polymers, aluminum oxide, sapphire, or air.

In a related aspect, a device for generating entangled photon triplets is disclosed, which includes a waveguide extending from a proximal end for receiving pump radiation to a distal end through which entangled photon triplets generated via nonlinear interaction of the pump radiation with the waveguide exit the waveguide, wherein the waveguide is configured such that the entangled photon triplets are generated within the waveguide and reach said distal end at a rate in units of number of entangled photon triplets per second per pump power per length of the waveguide, where the rate is in a range of about 0.01 triplets/s/mW/mm to about 5 triplets/s/mW/mm, e.g., in a range of about 0.02 triplets/s/mW/mm to about 2 triplets/s/mW/mm, or in a range of about 0.05 triplets/s/mW/mm to about 1 triplet/s/mW/mm.

Further understanding of various aspects of the invention can be obtained by reference to the following detailed description in conjunction with the associated drawings, which are described briefly below.

DETAILED DESCRIPTION

Figure 1:
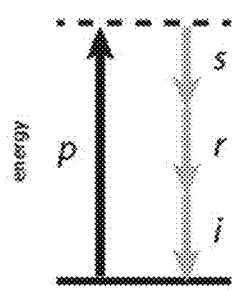
FIG. 1 schematically depicts an energy diagram for third-order spontaneous parametric down-conversion. In this process a single pump photon spontaneously splits into three signal photons by way of a virtual state (dashed line).

In some aspects, the present invention is directed to efficient triplet-photon sources that utilize a high index, highly nonlinear waveguide that is integrated on-chip. It is expected that in some embodiments the triplet generation rate of devices according to the present teachings will be up to four or six orders of magnitude greater than the rates achieved by current methods. The high triplet production rate and customizable spectral properties unique to integrated sources according to the present teachings enable a practical direct triplet photon source for quantum information applications. As discussed in more detail below, the use of an integrated waveguide in many embodiments for generating triplet photons according to the present teachings provides robust, scalable, and commercializable photon sources for many emerging applications in quantum information.

In some embodiments, a triplet photon source according to the present teachings includes an integrated (on-chip) waveguide that is designed to enhance spontaneous splitting of pump photons via TOSPDC (Third Order SPDC). When pump photons (e.g., with a wavelength of 500 nm) enter into the waveguide, the combination of photon energy, materials, and geometry of the waveguide can greatly enhance the probability that a pump photon would spontaneously split into three entangled signal photons forming a triplet (e.g., three photons, each with a wavelength of 1500 nm). Further, in some embodiments, using the design criteria discussed herein, the signal photons can be generated in different propagating modes, as well as at different wavelengths. Subsequently, these signal photons can be routed to different output ports, if desired. These three signal photons share correlations (i.e. exhibit entanglement). For example, the total energy of the three signal photons must equal the energy of the pump photon and the three-photons must be created simultaneously (i.e. exhibiting time-energy entanglement). Such correlations are the cornerstone of quantum information applications including quantum communication, quantum cryptography, and quantum computing.

The term "modal overlap" as used herein refers to a spatial overlap of two propagating modes within a waveguide, defined by Equation (12) below. The term "high modal overlap" as used herein refers to a modal overlap that can lead to a nonlinear coefficient greater than at least about 20/W/km.

An integrated triplet-photon source according to the present teachings can be a key resource for commercial quantum information applications and for performing many fundamental experiments in quantum optics. The ultra-secure-communications industry utilizes entangled photon pairs to transmit encryption keys and detect potential eavesdroppers over a secure quantum link. An ideal pair source should be either "on-demand" or have a "heralding" photon (an auxilliary photon that is time-correlated with the pair). These sources can reduce background noise by allowing the user to arm their single-photon detectors only when the photon pair is expected to arrive. In some embodiments, the triplet sources according to the present teachings can act as a heralded pair source, producing a pair of photons with a spectrally separated heralding photon. In addition, a triplet-photon source according to the present teachings can be a key component of a multi-party secure quantum network. Further, triplet photons sources according to the present teachings can be used in photonics-based quantum computers. Further, in some embodiments, the on-chip triplet photons sources according to the present teachings can be directly integrated with other quantum circuit elements.

Theory of TOSPDC

The generation of photon triplets via third-order spontaneous parametric down-conversion (TOSPDC) utilizes the third-order polarization ($\chi^{(3)}$) to generate entangled triplets that may be used for quantum information applications. In this process, a single "pump" photon is spontaneously annihilated and splits into three "signal" photons by way of a virtual state, as shown schematically in FIG. 1.

To differentiate these three photons, they are labeled as signal 1 (s), signal 2 (r), and idler (i). These photons obey energy conservation given by:

$$\hbar\omega_p = \hbar\omega_s + \hbar\omega_r + \hbar\omega_i,  \qquad \text{Eq. (1)}$$

where $\hbar\omega_p$ is the energy of the pump photon (with a similar notation for signal photons). Analogous to second harmonic generation, momentum must be conserved for efficient conversion. Using equation 1, momentum conservation is described using:

$$\Delta k_{cw}(\omega_r, \omega_s) = k_p(\omega_p) - k_s(\omega_s) - k_r(\omega_r) - k_i(\omega_p - \omega_s - \omega_r) + \Phi_{NL} \qquad \text{Eq. (2)}$$

where, $\Delta k_{cw}$ is the wavevector mismatch, $k_p(\omega_p)$, $k_s(\omega_s)$, $k_r(\omega_r)$, $k_i(\omega_p - \omega_s - \omega_r)$ are the momentum of the pump, signal (s), signal (r), and idler (i) photons (respectively) within the waveguide, $\omega_i = \omega_p - \omega_s - \omega_r$, and $\Phi_{NL}$ is the nonlinear phase. For a particular frequency, this is related to the effective index, n, through $k = \omega n/c$, where c is the speed of light.

The rate of triplet generation for a continuous wave pump is given by:

$$N_{cw} = \frac{2^2 3^2 \hbar c^3 n_p^3 L^2 \gamma^2 P}{\pi^2 \omega_p^2} \qquad \text{Eq. (3)}$$

$$\int d\omega_r \int d\omega_s h(\omega_r, \omega_s, \omega_p - \omega_r - \omega_s) \text{sinc}^2\left[\frac{L}{2}\Delta k_{cw}(\omega_r, \omega_s)\right].$$

In these expressions, $\hbar$ is the reduced Planck's constant, c is the speed of light, $n_p$ is the effective refractive index for the pump radiation, L is the length of the device, P is the power, $\omega_p$ is the pump frequency, $\gamma$ is the nonlinear coefficient, a figure of merit for the strength of the nonlinear process, defined by the following equation, $$\gamma = \frac{3\chi^{(3)} \omega_{p0}}{4\varepsilon_0 c^2 n_p^2 A_{eff}}, \qquad \text{Eq. (4)}$$

and, $$h(\omega_r, \omega_s, \omega_i) \equiv \frac{k_s' \omega_s}{n_s^2} \frac{k_r' \omega_r}{n_r^2} \frac{k_i' \omega_i}{n_i^2}. \qquad \text{Eq. (5)}$$

For these expressions, $A_{eff}$ is the effective area, defined further below, and k' denotes the first derivative with respect to $$\omega, \frac{dk}{d\omega}.$$

The nonlinear phase can be defined as follows:

$$\Phi_{NL} = [\gamma_p - 2(\gamma_{pr} + \gamma_{ps} + \gamma_{pi})]P \qquad \text{Eq. (6)}$$

where each $\gamma$ is defined according to the above Equation (4) with $\gamma_p$ corresponding to the pump mode and $\gamma_{pr}$, $\gamma_{ps}$, and $\gamma_{pi}$ take into account, respectively, the overlap of the pump mode with the signal (1), signal (2) and the idler photons.

The above theory illustrates that reasonable efficiencies for the production of direct entangled triple photons can be achieved for vanishing values of wavevector mismatch $\Delta k_{cw}$ (i.e., $\Delta k_{cw} \approx 0$), a condition known as "phase matching." The phase matching permits constructive interference of generated photons over interaction lengths much longer than the wavelength of light. For common optical materials, the index of refraction is wavelength dependent, being higher at typical pump wavelengths (at visible frequencies) and lower at signal frequencies (at near-infrared frequencies), creating non-zero values of $\Delta k_{cw}$, thus reducing the number of triplet photons that can be generated as shown in Equation (3).

To achieve phase matching, in some embodiments according to the present teachings a waveguide that has a large refractive index contrast between a core and a cladding (e.g., a difference of about 0.2 or greater) can be employed to create a multimode waveguide at the pump (e.g., visible radiation) wavelength. The fundamental transverse-electric-like (TE) and transverse-magnetic-like (TM) modes can extend to signal (e.g., near-infrared) radiation wavelengths, meanwhile there can be several higher-order modes (HOM) at the pump wavelength, which can propagate with the reduced momentum necessary to phase match pump photons to signal photons. As discussed in more detail below, in some embodiments, such HOMs of the pump laser radiation are utilized to obtain phase matching for efficient generation of direct entangled triplet photons.

The $\gamma$ parameter in the above Equation (4) shows that the rate of triplet production depends strongly on the intrinsic $\chi^{(3)}$-nonlinearity of the material in which the triplet photons are generated (herein also referred to as the core material) as well as the effective area $A_{eff}$. In particular, an increase in the intrinsic $\chi^{(3)}$-nonlinearity of the material results in an increase in the triplet photon production rate. Further, an increase in the difference between the refractive optical index of the core material and a cladding material surrounding the core material leads to smaller effective areas, $A_{eff}$, which enhances production rates.

For producing triplet photons in silica fibers ($SiO_2$), the nonlinear coefficient may be about 19/W/km. Various embodiments disclosed herein may utilize $TiO_2$, which has enhanced nonlinearity compared with silica fibers ($\chi^{(3)}$ of $TiO_2 \sim 30 \times \chi^{(3)}$ of $SiO_2$) and exhibits stronger light confinement in waveguides due to a higher core/cladding index difference. In one example, this results in about 10 times more confinement. This can lead to an increase in triplet generation of a factor of 1000 in $TiO_2$ waveguides as compared to silica fibers. Therefore, the nonlinear coefficient $\gamma$ may be used as a figure of merit for the generation of triplet photons in various embodiments disclosed herein. Various embodiments disclosed herein may achieve $\gamma > 19$/W/km, which exceeds the ideal nonlinearity of $SiO_2$ for this process. In some embodiments configured according to teachings disclosed herein, $\gamma$ may be greater than about 90/W/km, for example, $\gamma$ may be about 250/W/km.

Figure 2:
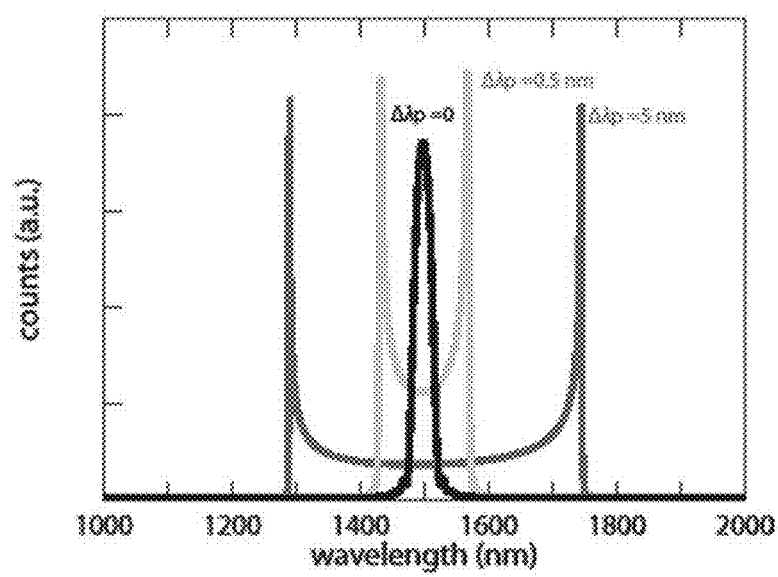
FIG. 2 shows theoretical spontaneous triplet spectra for a representative $TiO_2$ waveguide with a phase match point at 500 nm when pumped with 500 nm light slightly blue shifted from the phase match point.

Applicants have also discovered that the signal-frequency spread can be highly sensitive to small changes in the pump frequency. By way of example, FIG. 2 shows theoretically calculated spectra of spontaneous triplet photons generated in a $TiO_2$ waveguide when phase matching conditions are met. These spectra show that a small variation in the wavelength of the pump photons can drastically change the span of wavelengths in the triplet photons signal. This sensitivity of the signal spectrum on the stability of the pump wavelength places strict demands on the stability of the pump wavelength or requires a stable tunable pump laser.

The various terms and phrases are herein employed consistent with their ordinary meaning in the art. For additional clarity, the following terms are described below:

The photon loss as a result of propagation through a material can be defined as follows:

$$P(z) = P(0)e^{\alpha z} \quad \text{Eq. (7)}$$

wherein,
  $\alpha$ denotes the coefficient of absorption (herein also referred to as the absorption coefficient),
  $P(0)$ denotes input radiation power introduced into the material,
  $P(z)$ denotes the radiation power after the passage of the radiation through a length (z) of the material. In addition, scattering losses can diminish the power of the pump or signal radiation propagating through a material. The coefficient of scattering loss can be defined in a similar manner as shown in Equation (7).

A material is "substantially transparent" to a radiation wavelength, as used herein, if it exhibits a maximum absorption coefficient, as defined by Equation (7) above, at that wavelength in a range of about 500,000 $m^{-1}$ to 50,000 $m^{-1}$ (about 20000 to about 2000 dB/cm), and preferably an absorption coefficient less than about 50 $m^{-1}$ (2 dB/cm) or 5 $m^{-1}$ (0.2 dB/cm).

The linear refractive index (n) (herein also referred to as linear refractive optical index or linear index of refraction) of a material can be defined as the ratio of the speed of light (c) in vacuum relative to the speed of light in that material (v):

$$n(f) = \frac{c}{v} \quad \text{Eq. (8)}$$

The linear refractive index of a material is generally a function of the radiation frequency (f).

The "nonlinear refractive index" (herein also referred to as the "nonlinear optical refractive index") of a material ($n_2$) is defined as:

$$n_2 = \frac{3\chi^{(3)}}{4n_0^2 \epsilon_0 c} \quad \text{Eq. (9)}$$

where,
  $n_2$ denotes the nonlinear refractive index,
  $\chi^{(3)}$ is the third-order non-linear optical susceptibility,
  $n_0$ denotes the linear refractive index,
  $\epsilon_0$ is the permittivity of free space,
  and c is the speed of light in vacuum.

The terms "about" and "approximately" are used herein interchangeably and are intended to indicate a variation of at most about +/−5 percent of a numerical value. The term "substantially" indicates a deviation from a complete state characterized by less than 5%.

Figure 3A:
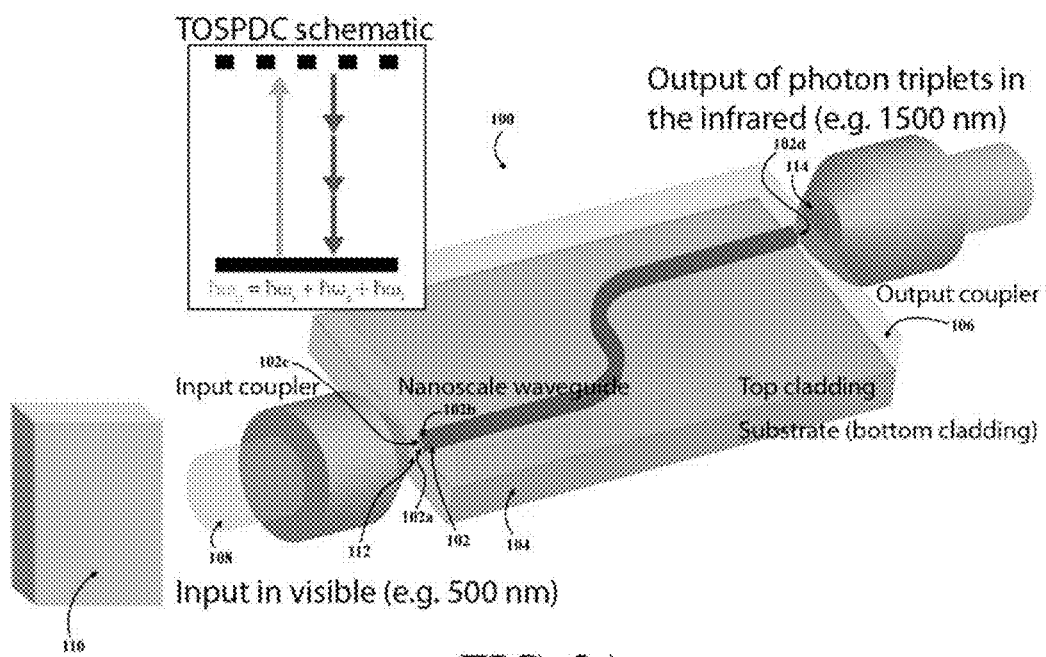
FIGS. 3A, 3B and 3C schematically depict a triplet photon source according to an embodiment of the present teachings.
Figure 3B:
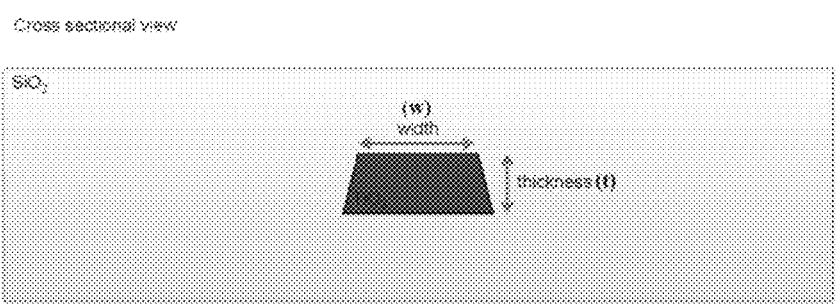
Figure 3C:
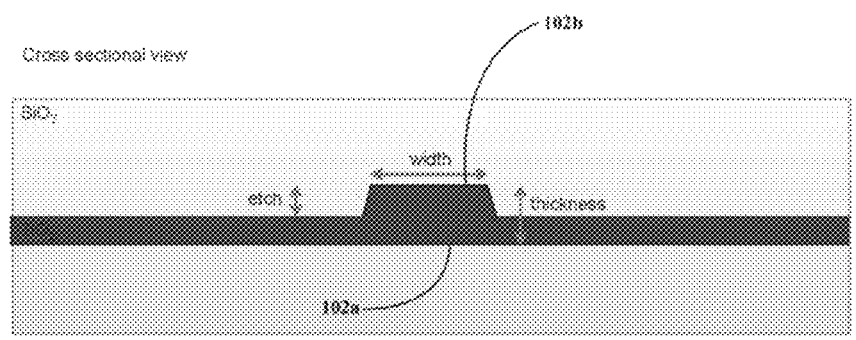

FIGS. 3A, 3B, and 3C schematically depict a device 100 according to an embodiment of the present teachings for generating direct entangled triple photons, which includes a waveguide 102 that is disposed on an underlying substrate 104. In this embodiment, the waveguide 102 has a substantially rectangular (e.g., trapezoidal) cross-sectional profile (in a plane perpendicular to the direction of propagation) and includes a lower surface 102a that is in contact with the substrate 104, and an upper surface 102b over which a top cladding layer 106 is disposed. In this embodiment, the sidewall angle of the waveguide (i.e., the angle between the sidewall of the waveguide and the bottom surface of the waveguide) is about 75 degrees, though in other embodiments different sidewall angles can be employed. While in some implementations, the material forming the top cladding 106 is the same as the material forming the substrate, in other implementations, the substrate 104 and the top cladding 106 can comprise different materials. As discussed in more detail below, each of the substrate and the top cladding exhibits an index of refraction that is less than the index of the refraction of the material forming the waveguide.

The waveguide 102 includes a proximal end 102c that is adapted to receive laser radiation (pump photons) 108 from a laser source 110. The laser source 110 can be a continuous or a pulsed source. Some suitable examples of the laser source 110 include, without limitation, laser diodes, thermally-tuned laser diodes (e.g. distributed feedback, DFB, lasers), optically pumped solid state lasers, dye lasers, optical parametric amplifiers, optical parametric oscillators, as well as frequency converted versions of these lasers, e.g., doubled via second harmonic generation. In some embodiments, the laser source 110 can generate pump laser radiation with an average power, e.g., in a range of about 1 mW to about 10 W.

In this embodiment, an input coupler 112 (e.g., an SU-8 polymer coupling pad) facilitates the introduction of the pump photons into the waveguide 102. The waveguide 102 extends from the proximal end 102c to a distal end 102d through which direct entangled triplet-photons, which are generated via non-linear interaction of the pump photons with the material forming the waveguide 102 as discussed in more detail below, exit the waveguide. In this embodiment, an output coupler 114 (e.g., an SU-8 pad) facilitates the egress of the triplet photons from the waveguide (e.g., into downstream components). In some embodiments, a wavelength-selective filter may be introduced (e.g., as an on-chip device or a separate downstream component) to remove residual pump light while transmitting triplet photons. In some embodiments, the device 100 may further include one or more photon detectors. For example, the device 100 may include a plurality of superconducting nanowire single photon detectors integrated on chip. For example, as demonstrated by Faraz Najafi et al. "Membrane-integrated superconducting nanowire single-photon detectors" CLEO 2013, which is herein incorporated by reference in its entirety, superconducting nanowire single-photon detectors can be integrated on sub-400-nm-thick silicon nitride membranes, which can then be transferred and aligned to photonic structures on a secondary chip with sub-micron placement accuracy.

The waveguide 102 can be implemented in a variety of different shapes, e.g., S or serpentine shape. Specifically, in this embodiment, the waveguide 102 includes a bend to ensure that the input beam is not aligned with the output face of the waveguide so as to enhance the signal-to-noise ratio.

In this embodiment, the waveguide 102 is formed of a material that exhibits a linear refractive index ($n_{waveguide}$) that is equal to or greater than about 1.8 for at least the wavelength of the pump and signal (i.e., triplet) photons, and preferably over a wavelength range that includes the wavelength of the pump and signal photons. By way of example, the linear refractive index of the waveguide can be greater than about 1.8, e.g., in a range of about 1.8 and 4.2, for wavelengths in a range of about 200 nm to about 2500 nm.

The linear refractive index of the material forming substrate 104 ($n_{substrate}$) is significantly less than the linear refractive index of the waveguide. By way of example, in this embodiment, the linear refractive index of the substrate can be equal to or less than 1.6 for at least the wavelengths of the pump and signal photons, and preferably over a wavelength range in which the linear refractive index of the waveguide is at least about 1.8. By way of example, the linear refractive index of the material forming the substrate can be equal to or less than about 1.6 (e.g., in a range of about 1 to about 1.6) for wavelengths in a range of about 200 nm to about 2000 nm.

Similarly, the linear refractive index of the material forming the top cladding layer 106 can be significantly less than the linear refractive index of the waveguide. For example, the linear refractive index of the top cladding can be equal to or less than about 1.6 for at least the wavelengths of the pump and signal photons, and preferably over a wavelength range in which the linear refractive index of the waveguide is at least about 1.8

Moreover, the material forming the waveguide 102 exhibits a high third-order optical nonlinearity. For example, the material forming the waveguide can exhibit a high $\chi^{(3)}$-optical nonlinearity corresponding to a nonlinear refractive index ($n_2$) that is equal to or greater than about $1 \times 10^{-19}$ m$^2$/W, e.g., in a range of about $1 \times 10^{-19}$ m$^2$/W to about $3 \times 10^{-17}$ m$^2$/W.

Further, in this embodiment, the material forming the waveguide 102 is substantially transparent at both the pump and the signal radiation wavelengths. For example, the material can exhibit a coefficient of absorption of less than about 50 m$^{-1}$ at the pump and the signal wavelengths. By way of example, in some implementations, the waveguide 102 is preferably substantially transparent to radiation wavelengths from ultraviolet ($\lambda \geq 400$ nm) to telecommunications wavelengths (800-1600 nm) or longer. For example, the waveguide 102 can be substantially transparent to radiation wavelengths in a range of about 400 nm to about 2500 nm, e.g., in a range of about 500 nm to about 1600 nm.

The total loss (absorption plus scattering) of the waveguide 102 at the pump and signal wavelengths can determine the optimal device length for achieving maximum rate of triplet photons generation. In some implementations, such a device length ($L_{max}$) is given by:

$$L_{max} = \frac{\ln\left(\frac{\alpha_p}{3\alpha_s}\right)}{\alpha_p - 3\alpha_s}, \qquad \text{Eq. (10)}$$

where,
$\alpha_p$ is the coefficient of absorption plus scattering losses at the pump wavelength in the mode phase matched with one or more signal modes (e.g., in a higher-order propagating mode), and $\alpha_s$ is the absorptive plus scattering losses at the signal wavelength.

In various embodiments, materials may be optimized to reduce background noise. For example, it has been discovered based on photoluminescence tests that various materials used in devices disclosed herein revealed no sign of fluorescence signal above detector noise. This ensures that the photon triplet sources produce very low background IR noise. Thus, losses may be minimized so as to provide efficient devices. Further, nonlinearities may also be measured over a broad range of wavelengths and may be used to predict and understand device performance.

As noted above, in this embodiment, the waveguide 102 has a substantially rectangular cross-sectional profile with a maximum linear cross-sectional dimension (e.g., a diagonal dimension) in a range of about 100 nm to about 2000 nm. Further, the waveguide 102 can have a length (L) in a range of about 10 micrometers (μm) to about 10 centimeters (cm). Further, the waveguide 102 can have a thickness (t) in a range of about 100 nm to about 2000 nm, and a width (w) in a range of about 100 nm to about 2000 nm. As discussed in more detail below, the cross-sectional profile of the waveguide 102 and its dimensions can be selected so as to optimize the production of direct entangled triplet photons, e.g., by ensuring that the requisite phase matching criteria are met.

While in this embodiment, the waveguide 102 has a substantially rectangular cross-sectional profile, in other embodiments, other cross-sectional profiles, e.g., square, can be utilized.

In this embodiment, the waveguide 102 is formed of titania (TiO$_2$) and the substrate 104 and the top cladding 106 are both formed of silica (SiO$_2$). For example, the waveguide 102 can be formed from a polycrystalline anatase TiO$_2$ thin film deposited on the substrate 104, e.g., in a manner discussed below. In other embodiments, the materials forming the waveguide can include, without limitation, silicon nitride, diamond, silicon carbide, strontium titanate, chalcogenide glasses, sapphire, TeO$_2$, and/or ZnO. Further, in other embodiments, the materials forming the substrate and/or the top cladding can include, without limitation, magnesium fluoride (MgF$_2$), quartz, sapphire, SU-8, a fluoropolymer known as cytop, aluminum oxide (Al$_2$O$_3$), and/or zinc oxide (ZnO). Further, in some embodiments, the top cladding can be air or vacuum. Applicants have discovered unexpectedly that TiO$_2$ can be a particularly suitable material for forming the waveguide.

In use, pump photons generated by the laser source 110 (e.g., a source generating lasing radiation at a wavelength of 500 nm) is coupled into the waveguide 102. In some embodiments, the waveguide 102 is designed so as to provide a phase matching condition between one or more high order modes of the pump laser radiation introduced into the waveguide and one or more modes suitable for the propagation of triplet photons generated via nonlinear interaction of the pump radiation with the waveguide material. In particular, as discussed in more detail below, the dimensions of the waveguide can be selected such that the effective refractive indices of the waveguide at the pump wavelength and at the signal wavelength(s) (i.e., the wavelength of the triplet photons) would lead to the phase matching condition required for efficient generation of the triplet photons.

As noted above, the signal-frequency spread can be highly sensitive to fluctuations in the pump wavelength. An expansion parameter of the signal can be defined as the spread in signal wavelengths over the shift in pump wavelength from the perfectly phase-matched point. The expansion parameter can be highly dependent on the dispersion of the waveguide. For the simplest case of a pump photon splitting into three signal photons in the same mode, the first approximation of the full-width half-maximum of the signal wavelength at small pump detuning is given by:

$$\Delta \omega_s = \frac{\sqrt[4]{(\Delta k'_{ps})(\Delta \omega_p)}}{\sqrt{3k''_s}} \qquad \text{Eq. (11)}$$

where, $\Delta\omega_s$ is the theoretical full width at half maximum (FWHM) of the signal wavelength, $\Delta k_{ps}'$ is the group velocity mismatch between the pump and the signal (defined by $$\Delta k'_{ps} = k'_p - k'_s = \frac{1}{v_{g,p}} - \frac{1}{v_{g,s}} \text{ and } k' = \frac{dk}{d\omega}\bigg), \Delta \omega_p$$

is the pump mismatch from the point of perfect phase matching (given by $\Delta\omega_p = \omega_p - \omega_p$)), and $k_s''$ is the signal group velocity dispersion (given by $$k''_s = \frac{d^2 k}{d\omega^2}\bigg).$$

The above Equation (11) shows that for a finite offset in the pump wavelength, minimizing the group velocity mismatch and maximizing the group velocity dispersion can limit the expansion of the signal spectrum. As discussed in more detail below, this can be accomplished by manipulating the size, shape, and relative dimensions of the waveguide in which triplet photons are generated. In particular, fabricating waveguides on-chip in accordance with the present teachings provides access to additional degrees of freedom in waveguide dimensions and shape critical to dispersion engineering.

Figure 4A:
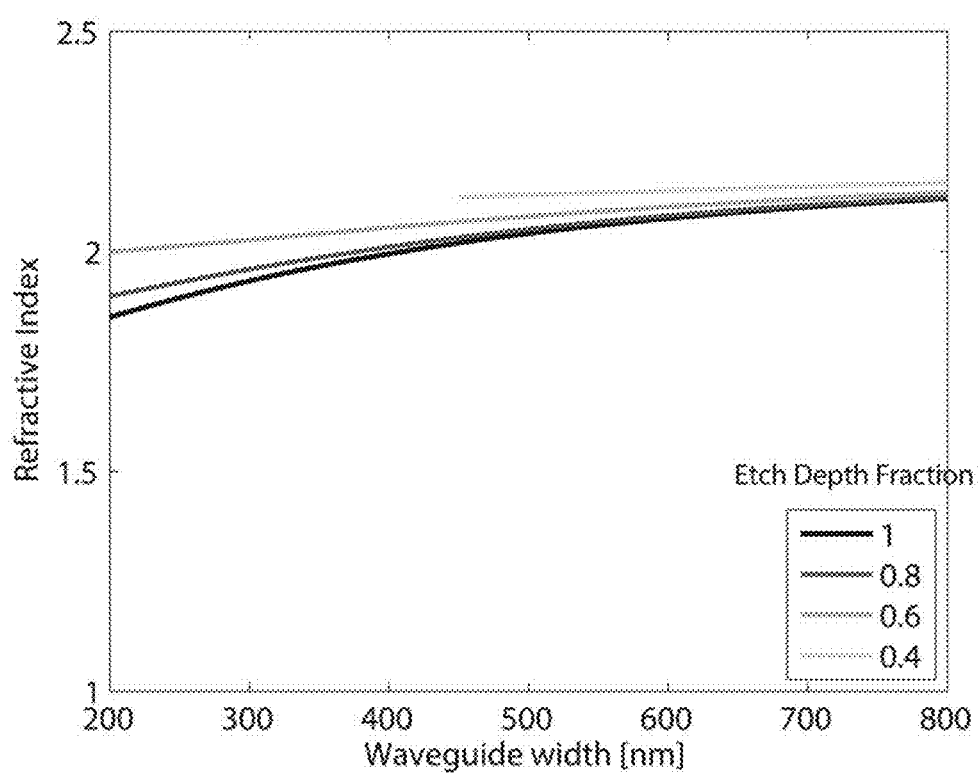
FIG. 4A shows theoretically calculated wavelength dispersion of the refractive index of a $TiO_2$ waveguide (a single film having a thickness of 750 nm) as a function of the waveguide width for a number of different etch depth fractions.
Figure 4B:
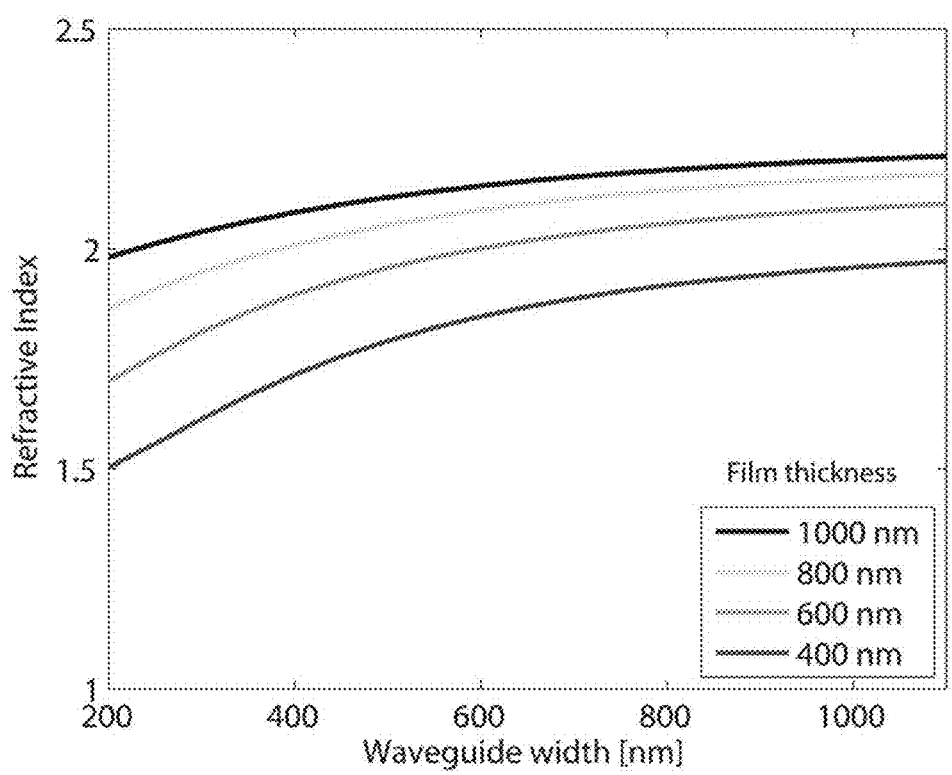
FIG. 4B shows theoretically calculated wavelength dispersion of the refractive index of a $TiO_2$ waveguide as a function of the waveguide width for a number of different waveguide thicknesses.

More specifically, the wavelength dispersion of the refractive index of the waveguide can depend on a number of parameters, such as the thickness, the width, and the etch depth fraction of the waveguide. As shown in FIG. 3C, the etch depth fraction of the waveguide refers to the ratio of etch to thickness of the waveguide. By way of example, FIG. 4A shows theoretically calculated wavelength dispersion of the refractive index of a TiO$_2$ waveguide as a function of the waveguide width for a number of different etch depth fractions. FIG. 4B shows the theoretically calculated wavelength dispersion of the refractive index of a TiO$_2$ waveguide as a function of the waveguide width for a number of different waveguide thicknesses. Such dependencies of the effective refractive index of the waveguide can be employed to ensure that the phase matching condition is achieved for a given pump wavelength and one or more signal wavelengths (i.e., one or more wavelengths associated with the simultaneously generated triplet photons).

For example, one or more of these parameters can be adjusted so as to obtain a match between an effective refractive index of at least one propagating mode of the pump radiation through the waveguide, which can in many cases be a higher-order propagating mode, and an effective refractive index of at least one waveguide mode in which the signal photons (i.e., the simultaneously generated triplet photons) can propagate, which can in many cases be a lower-order or fundamental propagating mode. The effective refractive index of a waveguide mode ($n_{eff}$) can be defined as $$\bigg(\beta = n_{eff}\bigg(\frac{2\pi}{\lambda}\bigg)\bigg),$$

where β denotes the phase change per unit length associated with radiation propagating in that mode and λ is the radiation wavelength. In general, the effective refractive index is a complex quantity that varies from one mode to another, and can depend on a number of factors, such as the intrinsic refractive indices of the waveguide's core and cladding and the spatial distribution of the fields associated with a mode.

Figure 5A:
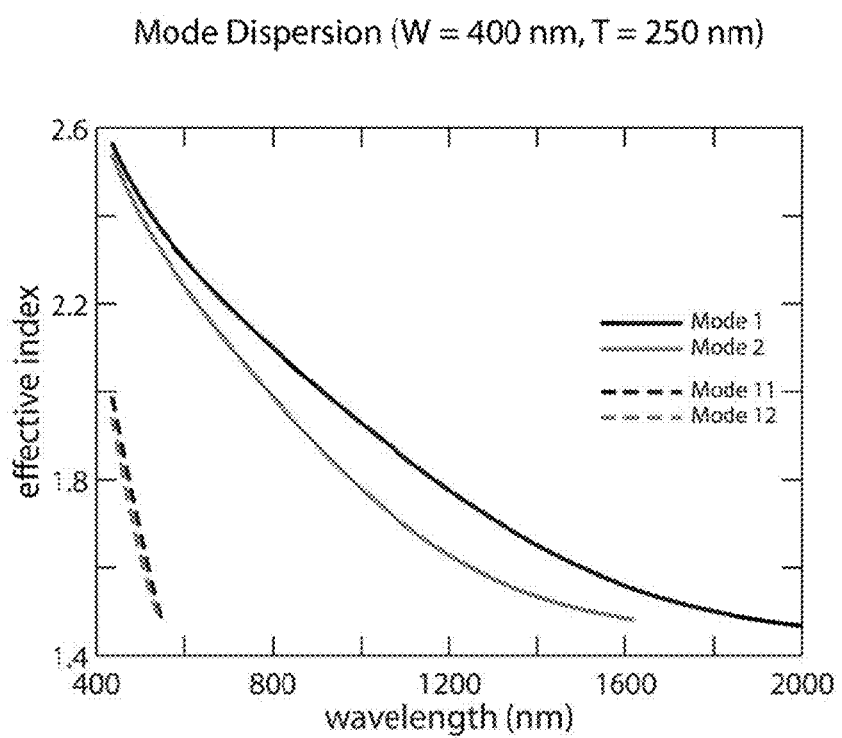
FIG. 5A shows simulated mode dispersion of four modes in an anatase $TiO_2$ waveguide having a top width of 400 nm, a thickness of 250 nm, a sidewall angle of 75°, and silica cladding.
Figure 5B:
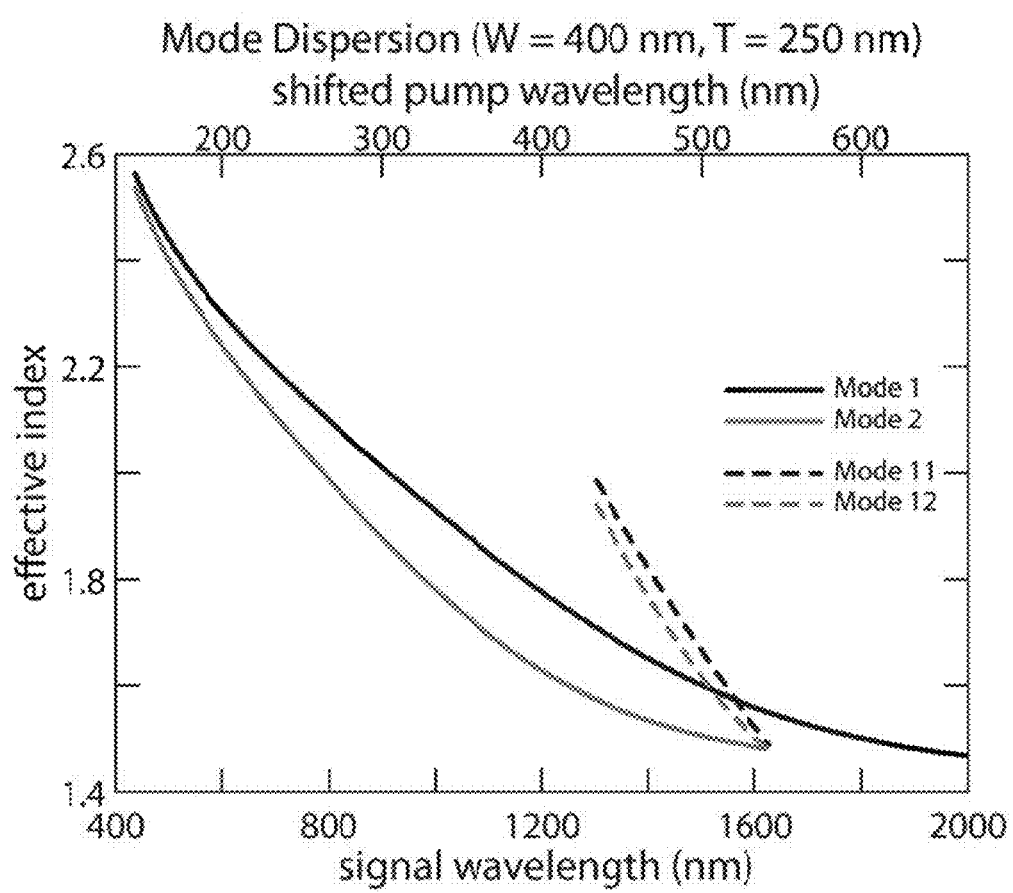
FIG. 5B shows dispersion of modes 11 and 12 of the four modes of FIG. 5A shifted to 3λ to visualize the intercepts between pump and signal modes that provide the perfect phase-matching points.
Figures 6A, 6B, 6C, 6D:
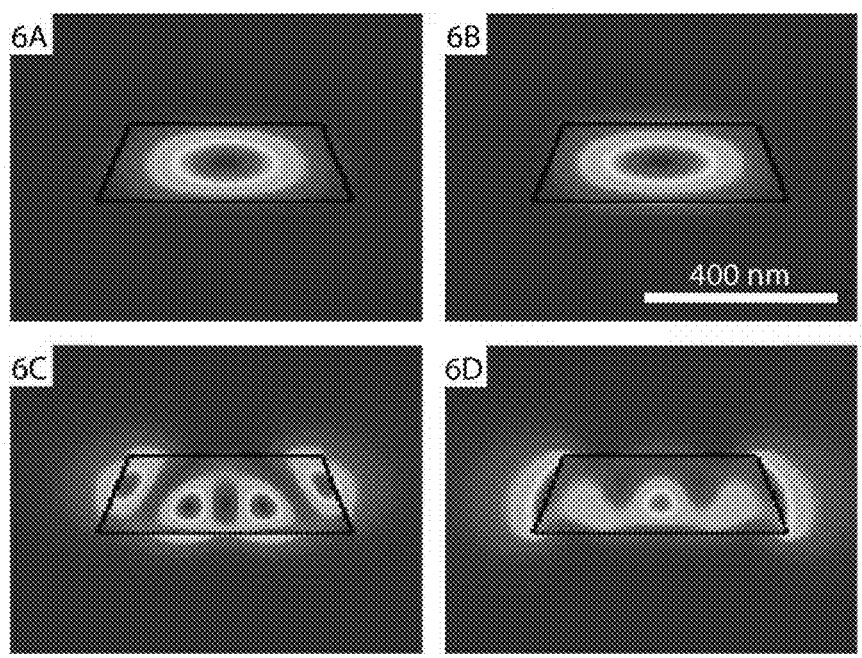
FIGS. 6A-6D show theoretically calculated intensity profiles of modes of the four modes of FIG. 5A: Mode 1 (6A); Mode 2 (6B); Mode 11 (6C); and Mode 12 (6D) at 450 nm wavelength.

By way of example, FIG. 5A shows simulated mode dispersion of four modes in an anatase TiO$_2$ waveguide having a width of 400 nm, a thickness of 250 nm, and silica cladding. The intensity profiles of these four modes are shown in FIGS. 6A-6D. FIG. 5B shows the data in FIG. 5A with dispersion modes 11 and 12 shifted to 3λ to visualize the intercepts between pump and signal modes that provide the perfect phase-matching points (522.4 nm between modes 11 and 1; 507.3 nm between modes 12 and 1; 547 nm between modes 11 and 2; and 544.4 nm between modes 12 and 2). Table 1 below shows phase matched modes and corresponding pump wavelength and TE polarization fraction and effective nonlinearity calculated using the modal fields.

TABLE 1

Phase matched modes and corresponding pump wavelength and TE polarization fraction.

|  | Phase Matching Points | | | |
|---|---|---|---|---|
| Pump Mode | 11 | 12 | 11 | 12 |
| Pump TE fraction | 17% | 89% | 17% | 89% |
| Signal Mode | 1 | 1 | 2 | 2 |
| Signal TE fraction | 99% | 99% | 0.30% | 0.30% |
| Phase matched pump wavelength (nm) | 522 | 507 | 547 | 544 |
| Nonlinear Coefficient (W$^{-1}$ km$^{-1}$) | 7 | 38 | 2 | 6 |

Figure 7:
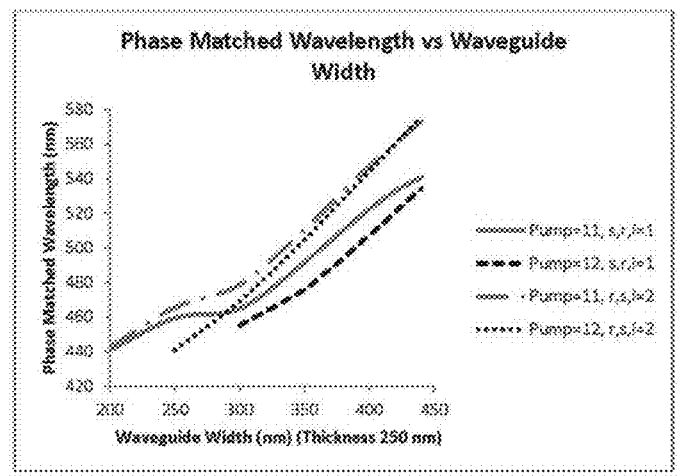
FIG. 7 shows simulated phase matching wavelengths between pump modes 11 and 12 and signal modes 1 (s, r, i=1) and 2 (s, r, i=2) as a function of waveguide width. These simulations are of anatase $TiO_2$ waveguides with a thickness of 250 nm surrounded by silica cladding.

By way of further illustration, FIG. 7 shows simulated phase matching wavelengths between pump modes 11 and 12 and signal modes 1 and 2 as a function of the waveguide width.

In many embodiments, a high conversion efficiency of pump photons into triplet photons requires both phase matching and good modal overlap. In the above example, the phase matching between modes 1 and 12, and between modes 2 and 11 and their respective effective nonlinearities (modal overlap) can ensure that a good conversion efficiency can be achieved by, e.g., introducing the pump photons via mode 12 and generating signal photons in mode 1 and/or introducing the pump photons via mode 11 and generating signal photons in mode 2. Improving the nonlinear coefficient value for the interaction can further enhance the efficiency of the TOSPDC process.

The degree of modal overlap can be estimated, for example, by using the overlap function described in Equation (12) below and can be used to calculate the effective nonlinearity of the TOSPDC interaction for each combination of modes.

The four-field overlap $\eta_{ijkl}$ can be expressed as:

$$\eta_{ijkl} \equiv \frac{1}{A_{\text{eff}(ijkl)}} = \frac{\int\int E_i^{(s)} E_j^{(p)*} E_k^{(p)*} E_l^{(p)*} dxdy}{\sqrt{\int\int |E^{(s)}|^2 dxdy \int\int |E^{(p)}|^2 dxdy \int\int |E^{(p)}|^2 dxdy \int\int |E^{(p)}|^2 dxdy}}$$

Eq. (12)

where i, j, k, l={x, y, z} and the superscripts s and p refer to the pump and signal E-fields, respectively. The effective area corresponds to the inverse of the overlap, and can be used in the definition of the nonlinear coefficient γ, given in Equation (4).

In various embodiments, waveguides may be designed to achieve the highest possible conversion efficiency from visible pump photons to infrared photon triplets. The design can depend on the choice of materials in the device, including for example the bottom cladding, top cladding, and core material of the waveguide. Dimensions and geometry of the device are parameters that can be changed to optimize the device, including for example the waveguide top width, thickness, etch fraction, and sidewall angle, as seen for example in FIG. 3C. The sidewall angle may be defined as the angle between the substrate surface and the side wall of the waveguide.

As noted above, due to the sensitivity of the output triplet-photon spectrum to changes in pump wavelength relative to the phase-matching points, devices according to the present teachings are designed and "matched" to a pump laser source. For example, mode-solving simulation software can be employed to implement the present teachings for designing the geometry and dimensions of a nonlinear waveguide in which the triplet-photons are produced. By way of example, a simulation software marketed by the tradename MODE Solutions by Lumerical Solutions, Inc. of Vancouver, Canada can be utilized to design, analyze and optimize waveguide structures according to the present teachings. One feature of this software is an Eigenmode Solver, which calculates the physical properties of guided modes in arbitrary waveguides using Maxwell's equations on a cross-sectional mesh of the waveguides. Meshing the waveguide geometry is accomplished using a finite difference algorithm. Maxwell's equations then become a matrix eigenvalue problem, which can be solved using sparse matrix techniques to obtain the effective index and mode profiles of the waveguide modes.

In some embodiments, for additional accuracy, the optical properties of a film of non-linear material that will be used for waveguide fabrication can be measured and this data can be used in the simulation. By way of example, such optical properties can be the refractive index of the material forming the waveguide, the dispersion exhibited by the refractive index, etc. This allows fabrication of waveguides with a specific set of dimensions and expected phase-matching point(s).

Accordingly, in some embodiments, simulation software may be used to determine the optimal waveguide dimensions for a given choice of device materials and pump wavelength. For example, the Eigenmode Solver described above may be used to calculate the properties of guided modes (for example, effective index, group velocity, dispersion, and mode profile) at visible, $\lambda_p$, and infrared, $3\lambda_p$, wavelengths. Mathematical software, such as MATLAB by The Mathworks, Inc., may be used to calculate the modal overlap using the visible and infrared mode profiles of each possible pair of modes at their phase matching point, e.g. using Equation (12) above. Utilizing information about the material's nonlinear index, $n_2$, the effective nonlinearity, γ, may be calculated. In some embodiments, waveguide dimensions are chosen such that at least one visible mode (at $\lambda_p$) is phase matched with an infrared mode (at $3\lambda_p$) with high effective nonlinearity (e.g. greater than 50/W/km in $TiO_2$ waveguides).

In some embodiments, a method for designing a waveguide for generating direct entangled photon triplets includes modeling a waveguide dimensioned to support one or more propagating modes in the visible portion of the electromagnetic spectrum, e.g. in a wavelength range from about 270 nm o about 700 nm, or in a range of about 400 nm to about 700 nm, and one or more propagating modes in the infrared portion of the electromagnetic spectrum. e.g. in a range from about 800 nm to about 2000 nm. The method further includes calculating wavelength dispersion curves of the visible and the infrared modes for a plurality of values of one or more geometric dimensions or parameters of the waveguide. Mathematical software, such as eigenmode solver by Lumerical MODE Solutions and MATLAB, may be used for such calculations. The method may further include identifying, based on the calculated dispersion, one or more geometric dimensions or parameters of the waveguide that result in phase matching between the visible and infrared modes. In some embodiments, the method may further include calculating modal overlap characteristic, such as a nonlinearity coefficient for the modes, for a plurality of values of one or more geometric dimensions or parameters of the waveguide. The method may include identifying, based on the calculated dispersion characteristic and the modal overlap characteristic, one or more geometric dimensions or parameters of the waveguide that result in both phase matching and high modal overlap between the visible and infrared modes.

Implementation of the design of a triplet photon-generating device may use several techniques. In some embodiments, after fabrication, third harmonic generation (THG) using either a tunable or broadband mid-infrared source can be used to obtain accurate information about the wavelength of the phase matching points. A tunable visible laser or diode laser with wavelength directly on the phase match points can then be used to pump the device and efficiently generate a narrow spectrum of triplet photons. For example, FIGS. 12A-12D, which are described further below, show measured THG spectra from fabricated waveguides. Alternatively, many waveguides can be fabricated on the same chip with slightly different dimensions (for example, top widths). The waveguide with a phase matching point that matches the wavelength of the available visible pump laser may be utilized. This allows use of higher power visible lasers which tend to have a fixed wavelength.

THG is the inverse process of down-conversion and relies on the same nonlinearities and is subject to the same restrictions in order to achieve high conversion efficiency. The impact of modal overlap on third order spontaneous parametric down-conversion (TOSPDC) may be investigated by using data from third harmonic generation (THG), for example, in $TiO_2$ waveguides. THG and TOSPDC rely on the $\chi^{(3)}$ nonlinearity in the medium. Most $\chi^{(3)}$ tensor elements in materials are zero. Applicants have found that the modal overlap needs to be calculated only for the field components which will excite each non-zero $\chi^{(3)}$ tensor element, rather than the total modal fields.

For example, the nonlinear field excited by the $\chi^{(3)}$ nonlinearity is given by $\vec{E}_{NL} = C\chi^{(3)}\vec{E}_1\vec{E}_2\vec{E}_3$, where $E_1$, $E_2$, and $E_3$ are the incident fields and $E_{NL}$ is the excited field. The conversion efficiency of the nonlinear process is determined largely by the overlap between the incident and excited fields. For anatase $TiO_2$, the only nonzero tensor elements are $\chi^{(3)xxxx}$, $\chi^{(3)yyyy}$, $\chi^{(3)zzzz}$, $\chi^{(3)yyzz}$, $\chi^{(3)zzyy}$, $\chi^{(3)zzxx}$, $\chi^{(3)xxzz}$, $\chi^{(3)yyxx}$, $\chi^{(3)xxyy}$, and all permutations of these indices. The only overlap calculations that need to be completed correspond to these indices, i.e. $\iint \vec{E}_{x1}\vec{E}_{x2}\vec{E}_{x3}\vec{E}_{x4}dxdy$ for $\chi^{(3)xxxx}$ and $\iint \vec{E}_{y1}\vec{E}_{y2}\vec{E}_{y3}\vec{E}_{y4}dxdy$ for $\chi^{(3)yyzz}$ and so forth. For a material that is polycrystalline with grains less than about $1/10$ of the incident wavelength in size and oriented randomly, the contribution of each nonlinear tensor element will be equivalent due to symmetry conditions. Further, for amorphous and isotropic materials, e.g., ones where the grains are less than about $1/10$ of the wavelength, the tensor can be treated as effectively diagonal, e.g., only xxxx, yyyy, and zzzz terms can be considered. This theory can be applied to other polycrystalline, oriented polycrystalline, single crystal, and amorphous materials. Proper considerations of the symmetry conditions, alignment of the crystal, alignment of the modal fields, and non-zero tensor elements can be made. In some embodiments, this technique may be used to achieve good agreement between predicted phase matching points and THG observed in devices that are fabricated. The same methods will hold true for similar $\chi^{(3)}$ nonlinear process (i.e. THG and TOSPDC).

Unlike third harmonic generation (THG), third-order spontaneous parametric down-conversion (TOSPDC) will occur if the pump wavelength is offset slightly from the phase match point. This results in generation of a broader spectrum of infrared photons. Due to the constraints of energy conservation and phase matching, the phase mismatch ($\Delta n_{eff} = n_{eff,p} - n_{eff,s}$) must be positive if the dispersion of the signal (infrared) mode is normal and negative if the dispersion of the signal (infrared) mode is anomalous.

Accordingly, in various embodiments, a device design method based on the theory of phase matching, energy conservation, and modal overlap may be created to drive the fabrication of triplet photon generating devices. For example, the method may employ mathematical software (e.g. an eigenmode solver by Lumerical MODE Solutions and MATLAB) to determine waveguide dimensions that have phase matching points in the wavelength range of visible pump lasers with high effective nonlinearity. Based on the dispersion of the modes involved in phase matching, the rate at which the signal spectrum broadens if the waveguide dimensions are off from the design due to fabrication variations may be estimated.

In some embodiments, the triplet photons, namely, signal 1 (s), signal 2 (r), and idler (i) photons can be generated in one propagating mode, that is, the phase matching condition is degenerate. In other embodiments, these triplet photons can be generated in 2 or 3 modes. By way of example, signal 1 (s) and signal 2 (r) photons can be generated in one propagating mode and the idler (i) photon can be generated in a different propagating mode. The generation of the triplet photons in different modes, e.g., characterized by different polarizations, can allow spectrally separating them. By way of example, in some embodiments, the individual triplet photons can be separated after exiting the waveguide by using, e.g., polarization optics, and dichroic mirrors. The spectral separation of the triplet photons can enable the heralding of the photon pairs. In some embodiments, by dispersion engineering sets of 3 or 4 modes (e.g., 1 for pump photons and 2 or 3 for the signal photons) in accordance with the present teachings, spectrally separate output photons can be produced. Different signal photons within the same triplet can then be sent along separate paths, even within the device.

In some embodiments, a triplet photon source according to the present teachings can be configured, e.g., via modal and dispersion engineering of its waveguide, to produce heralded photon pairs. The output signal of such a source can be separated into two or more modes that are spectrally distinct from one another. In some embodiment, this can be achieved by providing phase matching between the pump and the signal in two modes with different dispersion parameters. The larger the difference in dispersion parameters between the signal modes, the greater will be the spectral separation of signal photons propagating in those modes. A wavelength dependent coupler, for example, can be employed in an integrated photonic device to separate these signal modes.

Figure 8:
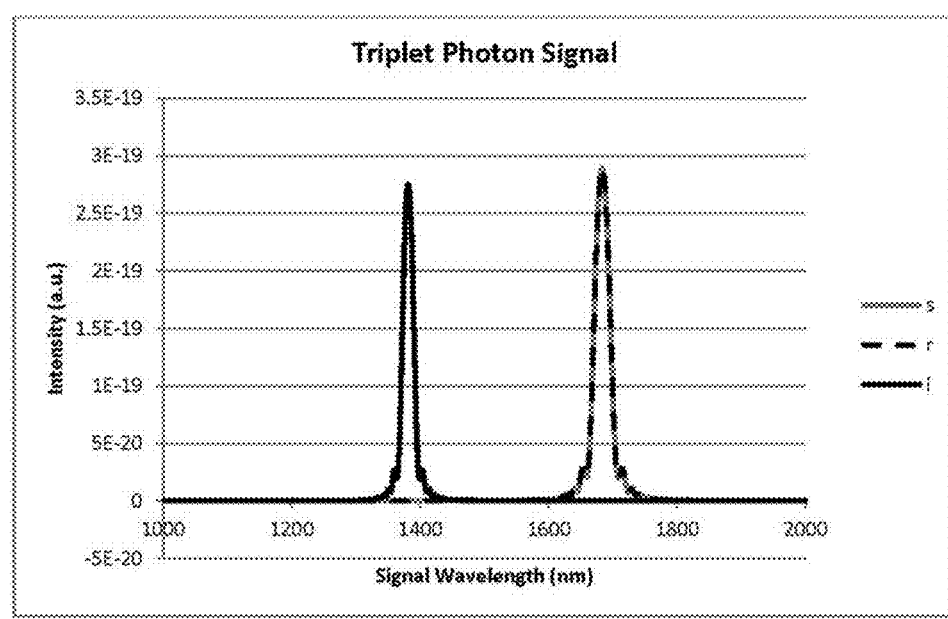
FIG. 8 shows exemplary calculated output signal spectra of entangled photon triplets in which the signal modes s and r are spectrally distinct from signal mode i.

By way of illustration, FIG. 8 shows simulated signal wavelengths in two different signal modes 1 and 2 discussed above in connection with a $TiO_2$ waveguide having a 400-nm width and a 250-nm thickness and a silica cladding. Phase matching is achieved near 520 nm with the pump mode 12 with signal photons generated in modes 1 and 2. The wavelength separation of the signal photons generated in these two modes can be utilized to separate the photons in these two modes after they exit the waveguide.

Figure 9A:
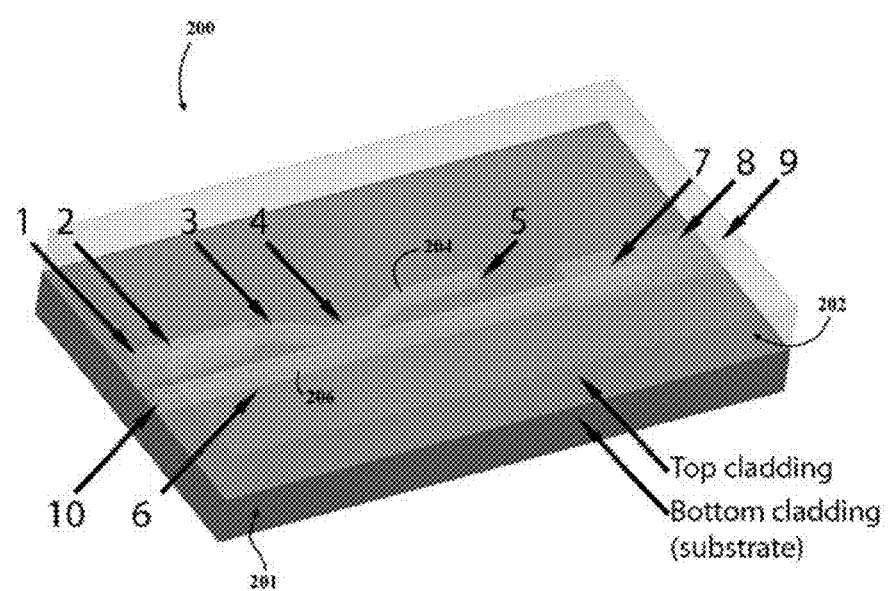
FIGS. 9A and 9B schematically depict a device for generating direct entangled photon triplets in accordance with another embodiment of the present teachings, which is implemented as an integrated TOSPDC source on-chip.
Figure 9B:
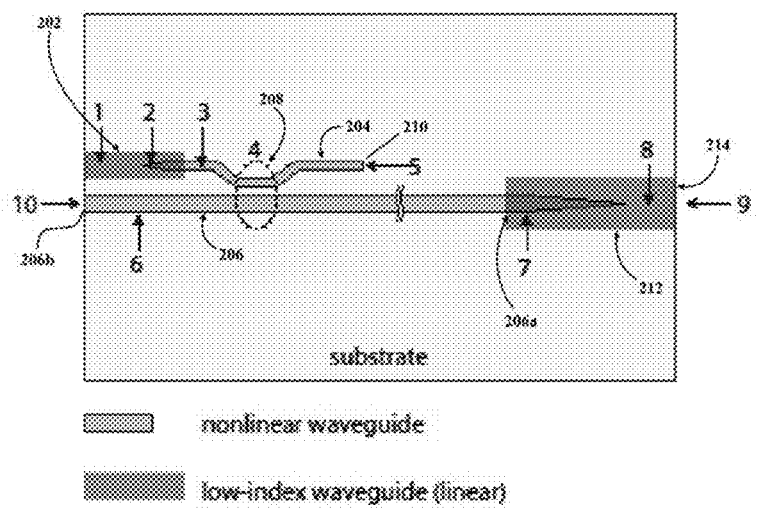

FIGS. 9A and 9B schematically depict a device 200 for generating direct entangled triplet photons in accordance with another embodiment of the present teachings, which is implemented as an integrated TOSPDC source on-chip. The device 200 includes an underlying $SiO_2$ substrate 201 on which various components of the device are disposed and a top cladding 202. An input coupler 203, e.g., an (SU-8) polymer coupling pad, receives laser radiation from a laser pump source (not shown) and couples that laser radiation to a single-mode $TiO_2$ waveguide 204. The device further includes a multi-mode $TiO_2$ waveguide 206 that can support higher order modes of the pump radiation, and is optically coupled to the single mode waveguide 204 via a SM-MM (single-mode/multi-mode) coupler 208. At least a portion of the pump radiation propagating through the single-mode $TiO_2$ waveguide is coupled by the SM-MM coupler 208 (via evanescent optical coupling) to the multi-mode $TiO_2$ waveguide, where some of that radiation excites one or more higher-order propagating modes of the multi-mode waveguide. The remainder of the pump radiation propagating through the single-mode waveguides is captured by the pump-light dump-port 210.

Similar to the previous embodiment, the multi-mode waveguide 206 is configured, e.g., in a manner discussed above, to provide phase matching between one or more HOM pump modes and one or more signal modes that can support direct triplet photons that are generated as a result of third-order non-linear interaction of pump radiation with $TiO_2$ forming the waveguide. The triplet signal photons propagate along the multi-mode waveguide to enter a tapered section 206a of the waveguide, which facilitates the coupling of the signal photons into an output coupler 212, e.g., an SU-8 pad, through which the triplet photons can exit the device via an output facet 214. In some embodiments, the multi-mode waveguide 206 includes an input port 206b that can be employed, e.g., for signal alignment after the chip.

Figure 10:
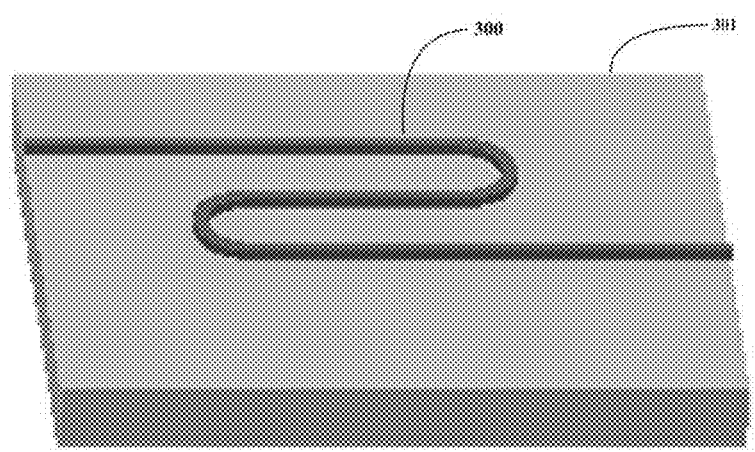
FIG. 10 schematically depicts a portion of an on-chip triplet photon device according to an embodiment of the present teachings that includes a serpentine waveguide disposed on an underlying substrate.

The nonlinear waveguides for generating direct entangled triplet photons according to the present teachings can have a variety of shapes. By way of further illustration, FIG. 10 schematically shows a portion of an on-chip triplet photon device according to an embodiment of the present teachings that includes a serpentine waveguide 300 disposed on an underlying substrate 301. Similar to the previous embodiments, the waveguide 300 and the substrate 301 are configured in a manner discussed above to allow the generation of direct entangled triplet photons in response to the introduction of a pump laser radiation into the waveguide.

In some embodiments, resonant cavities are employed to control and/or enhance the production of direct entangled triplet photons. For example, micro-ring resonators can be employed to control the output spectrum of the triplet photons. For example, micro-ring resonators can be formed of $TiO_2$, e.g., by employing the fabrication methods disclosed in "Integrated $TiO_2$ resonators for visible photonics," published in Opt. Lett. 37, 539-541 (2012).

Ring resonators are a building block for integrated optical devices. Theoretical and experimental results have shown enhancement in second and third-harmonic generation in several photonic material platforms. Enhancement and suppression of spontaneous parametric down-conversion has been studied in free space cavities and integrated photonic crystal cavities. Cavities have also been used to control the output spectrum of nonlinear photonic devices.

In some embodiments, the output spectrum of the device can be "squeezed" into the modes of the resonant cavity without lowering the total conversion efficiency. A micro-ring cavity can be used to improve the conversion efficiency of a TOSPDC photon triplet source by a few additional orders of magnitude while also narrowing and controlling the output spectrum within the confines dictated by phase-matching conditions.

Figure 11:
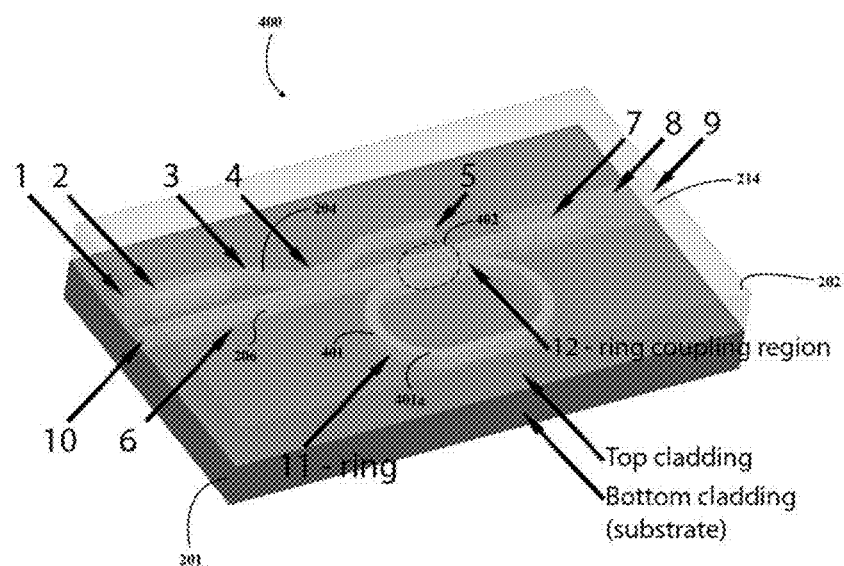
FIG. 11 schematically depicts an embodiment of a device according to the present teachings for generating direct entangled photon triplets. A ring resonator is included in this example, which may be used to further constrain the signal photon wavelengths produced via the Purcell effect.

FIG. 11 schematically depicts an embodiment of a device 400 according to the present teachings for generating direct entangled triplet photons. The device 400 includes the same components as those described above in connection with the above device 200, and in addition, it further includes a ring resonator 401 (herein also referred to as a micro-ring resonator) formed of $TiO_2$ that is disposed on the underlying substrate 201 and underneath the top cladding 201. The ring resonator 401 is formed of a ring waveguide 401a, which can have a cross-sectional area, e.g., width in a range of about 100 nm to about 2000 nm, and a thickness in a range of about 100 nm to about 2000 nm. In some implementations, the circumferential length of the ring resonator can be in a range of about 5 microns to about 20 mm.

The ring resonator 401 is optically coupled to the multi-mode waveguide 206 in a coupling region 402, e.g., via evanescent wave coupling. The optical coupling between the waveguide 206 and the ring resonator 401 allows for coupling of at least a portion of the pump photons into the ring resonator. The waveguide 401a of the ring resonator is configured in accordance with the present teachings to provide phase matching between one or more propagating modes of the pump photons and one or more modes in which signal photons can propagate. At least a portion of the entangled triplet photons generated within the ring waveguide 401 can couple to the waveguide 206 to exit that waveguide via the output facet 214.

The ring resonator 401 can enhance and/or shape the spectrum of the generated triplet photons. For example, the multiple passages of the pump photons around the ring waveguide 401a can enhance the production of the triplet photons. Further, in some embodiments, interference permits the propagation of only a finite number of whispering gallery modes in a select set of frequencies in the ring waveguide 401, thus dictating that the photons propagating through the ring be restricted to these available modes. This can, in turn, narrow the output spectrum of triplet photons generated via a TOSPDC process. Hence, a micro-ring waveguide can be an integral component for shaping the output spectrum of an entangled triplet photon source according to the present teachings.

In some aspects, photon losses, e.g., due to scattering and/or absorption, are taken into account in designing a waveguide for generating direct triplet photons via TOSPDC interaction of a pump radiation with the waveguide's material.

In the absence of photon losses, the rate of direct generation of photon triplets (denoted below as $R_3$) from TOSPDC can be qualitatively given by $R_3 \approx \zeta N_p(0)L$, where $N_p(0)$ is the number of pump photons entering the waveguide and the parameter $\zeta \propto \gamma^2$ (where $\gamma$ denotes the effective nonlinearity) represents the conversion efficiency per unit length, and L denotes the length of the waveguide. In the presence of photon losses, the triplet generation rate no longer increases linearly with the length of the waveguide (L). Such losses can be, for example, due to scattering and/or absorption. Moreover, as discussed in more detail below, certain photon-generating mechanisms, such as fluorescence, can interfere with the detection of the generated triplet photons. As discussed in more detail below, it has been discovered that in some embodiments, an optimal length ($L_{opt}$) for the waveguide exists such that the waveguide would be long enough to allow for the generation of a large number of photon triplets but short enough such that a large number of complete triplets reach the end of the waveguide when photon losses are taken into account. Moreover, it has been discovered that the length of the waveguide should be chosen to be less than a threshold so as to ensure that detection of "false triplets" due to fluorescence would not mask the detection of "true triplets" generated as a result of TOSPDC.

The triplet generation rate ($R_3$) in the presence of losses for a continuous wave (CW) radiation pump can be given by the following relation:

$$R_3 = \frac{2^2 3^2 \hbar c^3 n_p^3}{\pi^2 [\omega_p^0]^2} \gamma^2 L^2 P \left( \frac{\omega_0}{n_0^2(\omega)} g(\omega_0) \right)^3 \quad \text{Eq. (13)}$$

$$e^{-(\alpha_p + 3\alpha_s)L/2} \int \int_{-\infty}^{\infty} d\Omega d\Omega' F(\Omega, \Omega')$$

where P denotes pump power and $$\omega_0 = \frac{\omega_p^0}{3},$$

represents the pump frequency), $\hbar$ is Planck's constant divided by $2\pi$, $n_p$ is the refractive index for pump radiation, L is the length of the waveguide, $$g(\omega_0) = \left[ \frac{\delta k}{\delta \omega} \right]_{\omega = \omega_0}$$

is a factor resulting from the change of variable from k to $\omega$, $n_0(\omega)$ is the refractive index at the signal wavelength, $\alpha_p$ is the loss coefficient for the pump photons and $\alpha_s$ is the loss coefficient for the signal photons. The spectral amplitude $F(\Omega,\Omega')$ can be written as:

$$F(\Omega, \Omega') = \left(\frac{2}{L^2}\right) \frac{\cosh[\Delta \alpha L/2] - \cos[\Delta k(\Omega, \Omega')D_s L]}{\left(\frac{\Delta \alpha}{2}\right)^2 + \Delta k(\Omega, \Omega')D_s L}, \quad \text{Eq. (14)}$$

where $\Delta k(\Omega,\Omega') = \Omega^2 + \Omega'^2 + \Omega\Omega'$ represents the phase mismatch between the pump mode and the signal mode, and $\Delta\alpha = \alpha_p - 3\alpha_s$ can be considered as a loss mismatch. The integration variables $(\Omega,\Omega')$ correspond to signal detunings from $$\frac{\omega_p^0}{3}. \quad D_s = \delta^2 k_s / \delta \omega_s^2 \big|_{\omega_s = \omega_s^0}$$

is the signal group velocity dispersion.

In the above Eq. (13), the dispersion properties of the signal mode around the phase matching point is taken into account. If dispersion is ignored, the following simplified expression for triplet generation rate ($N_3$) can be obtained:

$$N_3 \equiv \int_0^L dz \frac{dN_3(z)}{dz} = \zeta \left( \frac{N_{p0}}{\alpha_p - 3\alpha_s} \right) \ln\left( \frac{\alpha_p}{3\alpha_s} \right) \quad \text{Eq. (15)}$$

where $N_{p0}$ is number of the pump photons entering the waveguide, $\alpha_p$ and $\alpha_s$ are as defined above, and $\zeta$ quantifies the conversion efficiency per unit interaction length between the pump and signal.

The waveguide length ($L_{opt}$) that can optimize $N_3$ can then be given by the following relation:

$$L_{opt} = \left( \frac{1}{\alpha_p - 3\alpha_s} \right) \ln\left( \frac{\alpha_p}{3\alpha_s} \right) \quad \text{Eq. (16)}$$

Figure 19A:
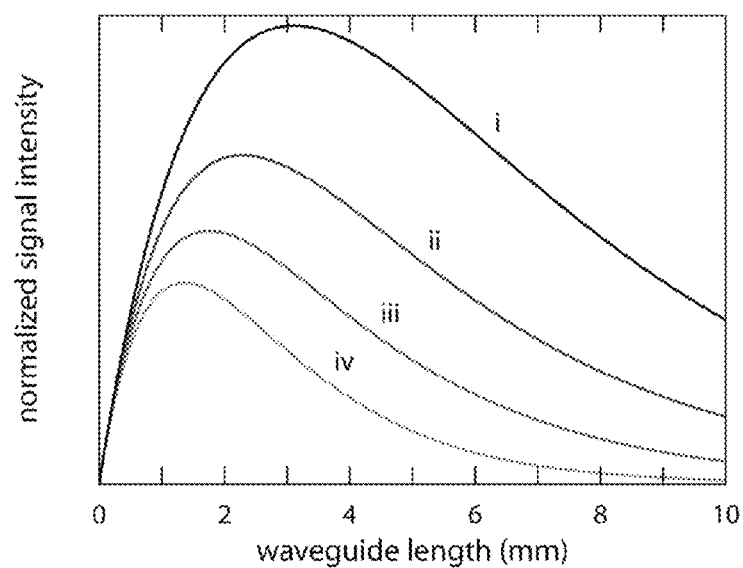
FIG. 19A is a calculated normalized signal intensity in a $TiO_2$ waveguide as a function of the waveguide length (L) for several values of losses, (pump and signal losses, respectively), (i) 16 and 4 dB/cm, (ii) 16 and 12 dB/cm, (iii) 28 and 4 dB/cm, and (iv) 28 and 12 dB/cm.
Figure 19B:
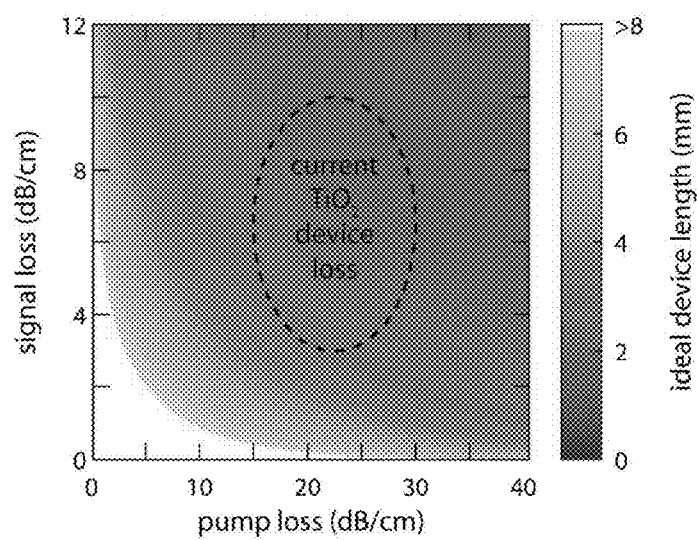
FIG. 19B is a plot of optimal waveguide length $L_{opt}$ as a function of the pump and signal loss coefficients $\alpha_p$ and $\alpha_s$.

FIG. 19A is a calculated normalized signal intensity in a $TiO_2$ waveguide as a function of the waveguide length (L) for several values of losses. In FIG. 19B, the optimal waveguide length $L_{opt}$ is plotted from the above Eq. (16) as a function of the pump and signal loss parameters $\alpha_p$ and $\alpha_s$.

In some aspects of the present teachings, it has been recognized that the detection of triplet photons generated in a waveguide can be adversely affected by other photon-generating mechanisms, such as fluorescence and two-photon generation. Such mechanisms, in addition to scattering, absorption and other photon loss processes, can degrade the rate at which the triplet photons reach the output facet of the waveguide. In addition, such mechanisms can adversely affect the detection of triplet photons that are generated in the waveguide.

For example, fluorescence from a waveguide's core and cladding can put a constraint on the pump power that can be applied to the waveguide for generating triplet photons. Fluorescence is most prevalent in materials having a direct bandgap, though it can also arise from impurities and defects even in materials having an indirect bandgap. Due to the low efficiency of TOSPDC (e.g., on the order of $10^{-15}$), even in waveguides that are formed of materials that exhibit a low level of fluorescence, the effect of fluorescence on the detection of triplet photons should be taken into account. In particular, fluorescence will produce photons at random times within the waveguide. The accidental arrival of three fluorescence photons within a detection time interval can be confused with the detection of triplet photons generated within the waveguide.

By way of example, the probability of detecting a "false triplet" due to three fluorescence photons arriving within a small time interval can be calculated as follows. Photon triplets can be detected by detecting all three photons within a triplet using single photon counters within an expected correlation time, which can be determined based on the timing jitter of single photons to be detected, the bandwidth of the photon triplets, dispersion within the waveguide, and dispersion in the optical path (e.g., optical fibers or other optical elements) from the photon triplet source (e.g., an output surface of a waveguide according to the present teachings) to the detectors. A typical timing jitter exhibited by state-of-the-art detectors is less than about 90 ps. The spread of photons in time due to dispersion ($\Delta\tau$), which is herein also referred to as the correlation time, can be obtained by the following relation:

$$\Delta\tau = GVD \times L' \times \Delta\lambda_s \quad \text{Eq. (17)}$$

where GVD denotes the group velocity dispersion of the medium in which the triplet photons propagate (e.g., in units of ps/nm/km), L' is the propagation distance within the medium (e.g., the length of a waveguide), and $\Delta\lambda_s$ is the bandwidth associated with the triplet photons. Depending on the bandwidth of the signal photons and the detection set-up, in some cases, the correlation time may range from approximately 100 ps to 1000 ps, with a theoretical minimum correlation time determined by the timing jitter of the detectors used for detecting the photons.

The rate of spurious photons triplet detections ($R_{falseT}$) due to fluorescence can be obtained from the following relation:

$$R_{falseT} = R_{fluorescence}^3 \Delta\tau_{correlation}^2 \quad \text{Eq. (18),}$$

where $R_{fluorescence}$ denotes the rate of the generation of fluorescence photons, and $\Delta\tau$ is the correlation time defined by the Equation (17) above.

The rate at which photons that are generated via fluorescence reach the end of a waveguide ($R_{fl}$) is given by the following relation:

$$R_{fl} = \rho_{fl} N_{P0} = \frac{\xi_{fl}}{\alpha_p - \alpha_s}(e^{-\alpha_s L} - e^{-\alpha_p L}) N_{P0} \quad \text{Eq. (19)}$$

where $N_{P0}$ is the rate of the introduction of pump photons into the waveguide, $\rho_{fl}$ is the conversion rate for generating fluorescence photons, $\xi_{fl}$ denotes the efficiency with which pump photons generate fluorescence photons per unit length in the waveguide, $\alpha_p$ and $\alpha_s$ are, respectively, the loss coefficients for the pump radiation and triplet photons radiation, and L is the length of the waveguide. The rate of generation of entangled photon triplets ($R_T$) (herein referred to also as the "true triplets") and the rate of generation of triplets due to fluorescence ($R_{flT}$) (herein referred to also as the "false triplets") can be obtained using the following relations:

$$R_T = \rho_T N_{P0} = \frac{\xi_T}{\alpha_p - 3\alpha_s}(e^{-3\alpha_s L} - e^{-\alpha_p L}) N_{P0} \quad \text{Eq. (20)}$$

$$R_{falseT} = \rho_{fl}^3 N_{P0}^3 \Delta\tau_{cor}^2 = \left(\frac{\xi_{fl}}{\alpha_p - \alpha_s}\right)^3 (e^{-\alpha_s L} - e^{-\alpha_p L})^3 N_{P0}^3 \Delta\tau_{cor}^2 \quad \text{Eq. (21)}$$

where $\rho_T$ and $\rho_{fl}$ represent, respectively, the rate at which pump photons are converted to photon triplets and fluorescence photons, $N_{P0}$ represents the rate at which pump photons are introduced into the waveguide at a proximal end thereof (e.g., at a facet that receives the pump radiation) and is related to the pump power $P_{P0}$ by the following relationship ($P_{P0} = N_{P0} \hbar \varphi_P$), where $N_{P0}$ is the number of photons per second and hop is the energy of each photon). In the above equations (20) and (21), the conversion rates $\rho_T$ and $\rho_{fl}$ take into account the effects of photon loss, e.g., due to scattering and/or absorption.

In order to distinguish "true photons" from "false photons", one can require that $R_T > R_{falseT}$. This can lead to the following relation for the rate of the pump photons ($N_p$) applied to waveguide for generating true photons:

$$N_P < \sqrt{\frac{\rho_T}{\rho_{fl}^3 \Delta\tau_{correlation}^2}} \quad \text{Eq. (22)}$$

where $\rho_T$ and $\rho_{fl}$ represent, respectively, the rate at which pump photons are converted to photon triplets and fluorescence photons and $\Delta\tau$ is defined by Equation (17) above. In other words, it has been discovered that maintaining the rate of pump photons (and consequently the pump power) below a threshold, e.g., the threshold provided by above Eq. (22), can optimize the detection of the entangled photon triplets against a background of fluorescence photons that are also generated in response to the application of the pump power to the waveguide.

Figure 20:
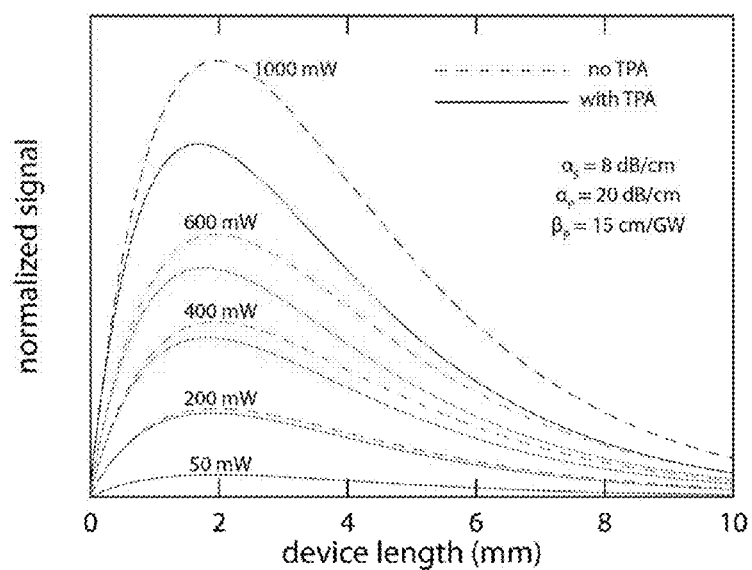
FIG. 20 shows calculated impact of two-photon absorption (TPA) losses on triplet photon signal as a function of waveguide's length for various pump powers.

In some embodiments, the effects of other photon loss mechanisms on triplet photon signal can also be considered. By way of example, FIG. 20 shows calculated impact of two-photon absorption (TPA) losses on triplet photon signal as a function of waveguide's length for various pump powers ($\alpha_s$ and $\alpha_p$ that are, respectively, the loss coefficients for the triplet photons and the pump radiation, and $\beta_P$ that is the two-photon absorption coefficient at the pump wavelength. were selected, respectively, to be 8 dB/cm, 20 dB/cm and 15 cm/GW). A number of curves depict the dependence of the triplet photon signal on waveguide length in absence of two-photon losses and a number of other curves show the dependence of the triplet photon signal on waveguide length in the presence of TPA. FIG. 20 shows that the peak of the triplet photon signal shifts to a shorter waveguide length and lower generation rate when two-photon absorption is taken in account (solid lines).

The above Equations (20) and (21) show that the rate at which true triplet photons reach the distal end of a waveguide in response to the introduction of pump radiation into the waveguide via its proximal end and the rate at which false triplets would be detected scale differently with the waveguide's length. In case of true triplets, all 3 photons of the triplet must exit the waveguide so as to result in the detection of a true triplet. In contrast, fluorescence photons are generated randomly and the detection of false three photon correlations depends only on the total rate at which fluorescence photons exit the waveguide. The waveguide's length at which the maximum number of fluorescence photons reaches the end of a waveguide ($L_{flmax}$) can be obtained using the following relation:

$$L_{flmax} = \frac{1}{\alpha_p - \alpha_s} \ln\left(\frac{\alpha_p}{\alpha_s}\right) \quad \text{Eq. (23)}$$

where $\alpha_p$ and $\alpha_s$ represent, respectively, the pump and signal loss coefficients (e.g., due to scattering and/or absorption) of the waveguide.

The optimal length of the waveguide, $L_{opt}$, at which the maximum number of photon triplets reach the distal end of the waveguide (i.e., the end of the waveguide opposite to the end at which pump radiation enters the waveguide) can be obtained using the following relation:

$$L_{opt} = \frac{1}{\alpha_p - 3\alpha_s} \ln\left(\frac{\alpha_p}{3\alpha_s}\right) \quad \text{Eq. (24)}$$

where, as noted above, $\alpha_p$ and $\alpha_s$ are, respectively, the loss coefficients for the pump and signal (triplet photons) radiation.

Eq. (25) below provides the ratio of $L_{flmax}$ and $L_{opt}$:

$$\frac{L_{opt}}{L_{flmax}} = \frac{\alpha_p - \alpha_s}{\alpha_p - 3\alpha_s}\left(1 - \frac{\ln(3)}{\ln\left(\frac{\alpha_p}{\alpha_s}\right)}\right) \quad \text{Eq. (25)}$$

Assuming that ($\alpha_p \neq \alpha_s$ and $\alpha_p \neq 3\alpha_s$), the ratio of $$\frac{L_{opt}}{L_{flmax}}$$

is less than 1 for an combinations of pump and signal loss.

Figure 21:
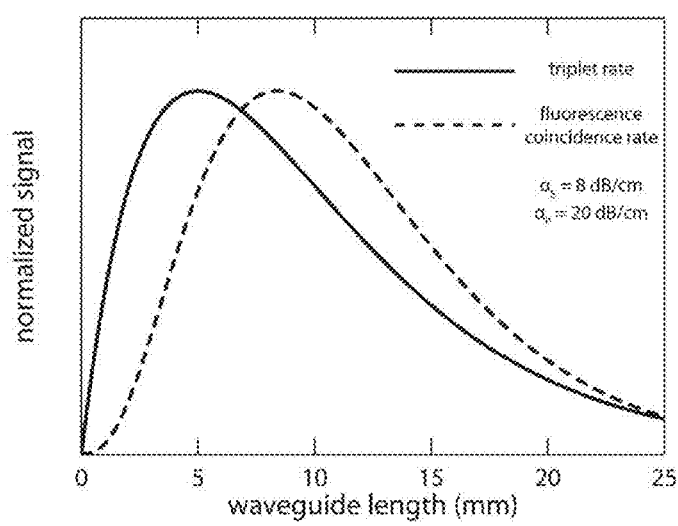
FIG. 21 shows curves corresponding to calculated normalized true triplet and fluorescence triplet coincidence rate as a function of waveguide's length.

The above equations show that the rate at which true photon triplets are generated in a waveguide rises and peaks more quickly than the spurious photon triplet coincidence rate due to fluorescence. By way of illustration, FIG. 21 shows calculated normalized true triplet and fluorescence triplet coincidence rate as a function of waveguide's length, depicting the peak of the curve associated with the true triplets occurs at a shorter waveguide length than the peak of the curve associated with fluorescence triplets. In other words, the true triplet generation rate rises and peaks before the fluorescence triplet coincidence rate. As such, there is a trade-off between achieving a high signal-to-noise ratio by keeping the device short and optimizing the true triplet generation rate. In many embodiments, this balance can be achieved by selecting the length of the waveguide to be equal to or less than the length given by the above Eq. (24) as a longer waveguide length would both reduce the photon triplet generation rate and signal-to-noise ratio.

In a waveguide, a variety of mechanisms, such as the bandwidth of the pump radiation, imperfections in the fabrication of the waveguide, can result in a finite bandwidth of the triplet photon signal. According to Fermi's golden rule, the transition rate for conversion of a pump photon of frequency $\omega_p$ into three signal photons at frequencies denoted by $\omega_s$, $\omega_r$, and $\omega_i$ is strongly suppressed for any combination of frequencies that does not satisfy the energy conservation constraint $\omega_p = \omega_s + \omega_r + \omega_i$. The probability of generating signal photons that satisfy energy conservation is maximal for those combinations that also satisfy the phase-matching or momentum conservation rule. In waveguides according to many embodiments of the present teachings, the propagation direction of guided modes is along the waveguides in the axial direction. In such cases, momentum conservation can be reduced to a scalar identity for the magnitude of the wavenumber of the propagating mode, $k_v = 2\pi n_{eff}^v/\lambda_v$, where $v=\{p, r, s, i\}$ and where p corresponds to the pump photon and r, s, and i represent the triplet signal photons.

Figure 22:
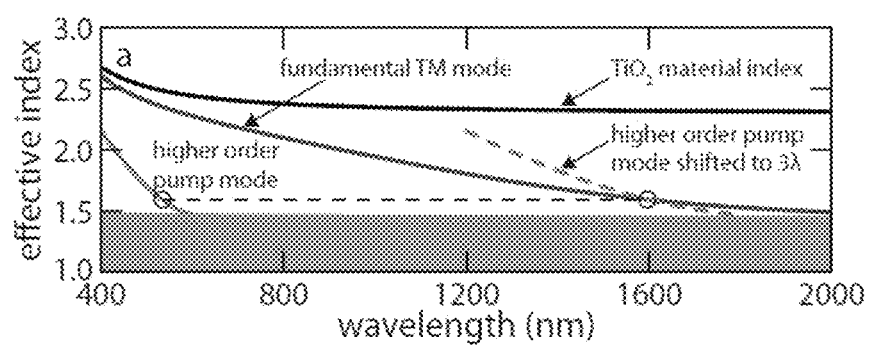
FIG. 22 shows the effective index for the $TM_{00}$ fundamental mode and $TM_{02}$ higher-order (pump) mode of a $TiO_2$ waveguide with 550-nm core width and 360-nm thickness, with $SiO_2$ cladding.

As discussed above, achieving phase-matching across nearly two octaves can be challenging as the refractive index of many materials decreases with increasing wavelength. As discussed above, in many embodiments such phase matching is achieved by employing higher order modes, e.g., for the propagating pump radiation. The waveguide dependence of the effective index $n_{eff}^v(\lambda)$ in guided modes is determined by the waveguide geometry, dispersion properties of the core and cladding materials, and mode order. By way of example, in FIG. 22, the effective index for the $TM_{00}$ fundamental mode and $TM_{02}$ higher-order (pump) mode of a $TiO_2$ waveguide with 550-nm core width and 360-nm thickness, with $SiO_2$ cladding, is shown. Higher-order modes have an effective index that is lower than those of the fundamental modes for a given value of 2. In this manner, the effective indices for highly disparate wavelengths between the fundamental and higher-order modes can be matched.

The perfect phase matching (PPM) point can be defined as the pump wavelength $\lambda_p^0$ for which $n_{eff}^s(3\lambda_p^0) = n_{eff}^p(\lambda_p^0)$, where $n_{eff}^s$ is the effective index of the signal mode of interest and $n_{eff}^p$ is the effective index of the pump mode. At the PPM point, the phase-matching condition requires that $k_p^0 = 3k_s^0$, since all three signal photons are degenerate. In the case of a monochromatic pump radiation, the signal frequency bandwidth of PPM can be determined from the dispersion of the pump and signal modes according to the following relation:

$$\Delta_{PPM} = \sqrt{\frac{4\pi}{L'|D_s|}} \quad \text{Eq. (26)}$$

where $$D_s = \frac{\partial^2 k_s}{\partial^2 \omega_s}$$

evaluated at $\omega_s = \omega_s^0$ is the signal mode group velocity dispersion (GVD) at PPM and L' is the nonlinear interaction length (e.g., the length of a waveguide). The bandwidth $\Delta_{PPM}$ corresponds to the FWHM (full width at half maximum) of the function $$\text{sinc}^2\left(\frac{\Delta k L'}{2}\right),$$

which determines the triplet generation rate as a function of finite phase mismatch, $\Delta k = k_p - (k_s + k_r + k_i)$.

In some embodiments, the pump wavelength can be blue-detuned away from the PPM point while still satisfying energy and momentum conservation efficiently for normal signal mode dispersion (or red-detuned for anomalous signal mode dispersion), which results in the generation of non-degenerate photon triplets (i.e., photon triplets where individual photons within the same triplet have different energies). The requirement of energy and momentum conservation for one-dimensional propagation results in an under-constrained system of equations with two free parameters. One of the parameters is fixed by choosing the pump frequency $$\omega_p = \frac{2\pi c}{\lambda_p}.$$

The remaining parameter can be one of the signal frequencies $\omega_v$, with $v=\{r, s, i\}$.

The range of signal frequencies over which energy and momentum conservation is fulfilled for TOSPDC is herein referred to as the signal bandwidth $\delta_s$ and is given by the following relation:

$$\delta_s = 2\left(\frac{2}{3}\right)^{1/2}\left[\frac{2(v_p^{-1}-v_s^{-1})}{D_s}\Delta_p + \left(\frac{D_p}{D_s}\right)\Delta_p^2\right]^{\frac{1}{2}} \quad \text{Eq. (27)}$$

where $\Delta_p = \omega_p - \omega_p^0$ and $\Delta_v = \omega_v - \omega_p^0/3$, with $v=\{r, s, i\}$, represent the pump and signal detunings from the PPM point, respectively. $\omega_p^0$ denotes the pump frequency corresponding to PPM, $v_p$ and $v_s$ are the group velocities of the pump and signal modes at the PPM point, and $D_p$ and $D_s$ are the group velocity dispersion for the pump and signal modes, respectively, given by $$D = \frac{d^2 k}{d\omega^2}$$

where k is the propagation constant of light in the given propagating mode.

For a long interaction length L (e.g., a waveguide length greater than about 100 µm) and a monochromatic pump with detuning $\Delta_p$, the signal frequencies that satisfy energy and momentum conservation can be simultaneously represented in a $(\omega_s, \omega_r)$-plane by the ellipse:

$$\Delta_s^2 + \Delta_r^2 - \Delta_r\Delta_s - \Delta_p(\Delta_r + \Delta_s) = A_p, \quad \text{Eq. (28)}$$

where $$A_p = \left(\frac{3}{16}\right)\delta_s^2 - \Delta_p^2, \Delta_p$$

represents pump detuning, $\delta_s$ and $\Delta_s$ represent, respectively, the signal bandwidth given by Eq. 27 and the signal detuning from the perfect phase matching point.

The photon triplet wavefunction can have a non-vanishing amplitude for signal frequencies outside the ellipse represented by the above Eq. (28). These frequencies, however, are strongly suppressed because of poor phase matching. The ellipse width $\delta_s$ grows with a scaling $(\Delta_p)^{1/2}$ for pump detuning $0<\Delta_p<\Delta_p^c=2(v_s-v_p)/(v_p v_s D_p)$ and with a scaling $(\Delta_p)^1$ for greater pump detuning ($v_s$, $v_p$ and $D_p$ represent, respectively, the signal and pump phase velocities and the pump group velocity dispersion).

Maximizing signal $D_s$ and minimizing $v_s-v_p$ and $D_p$ minimizes signal bandwidth for finite phase mismatch. In some embodiments, this approach can be adopted to minimize signal bandwidth in the case in which fabrication variations introduce finite phase mismatch. For fixed pump detuning $\Delta_p$, the signal bandwidth $\delta_s$ corresponds to the distance between the highest and the lowest points in the ellipse. The corresponding spectrum can consist of a two-peak structure with intensity maxima occurring roughly at frequencies: $\omega_p^0/3 \pm \delta_s/2$.

Figure 23:
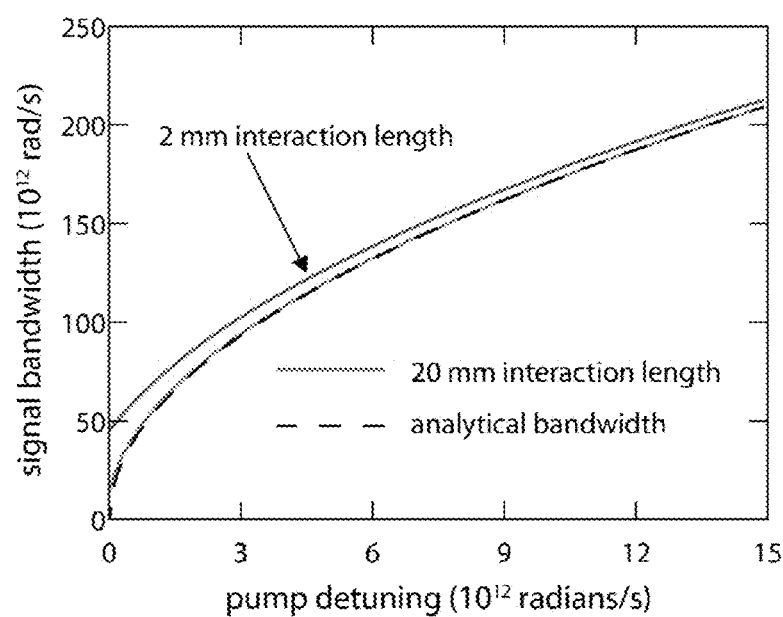
FIG. 23 shows theoretical signal bandwidths $\delta_s$ as a function of pump detuning $\Delta_p$ for a $TiO_2$ waveguide.

FIG. 23 shows theoretical signal bandwidths $\delta_s$ as a function of pump detuning $\Delta_p$ for a $TiO_2$ waveguide with a 550-nm width, a 360-nm thickness, straight (90-degree) sidewalls, and fully etched with an $SiO_2$ top and bottom cladding for interaction lengths L=2 mm and L=20 mm. The dashed black curve provides the bandwidth defined by the above Eq. (27), and the curves marked as 1 and 2 are numerically obtained signal bandwidths for 2-nm and 20-nm interaction lengths, respectively. As the pump-signal interaction length increases, the spectral amplitude of the three-photon state approaches a delta function in the phase mismatch $\Delta k = k_p - k_r - k_s - k_i$. In this limit, the bandwidth $\delta_s$ given by the above Eq. (27) accurately matches the numerical bandwidth.

In many embodiments, a waveguide according to the present teachings is designed so as to maximize the modal overlap between the pump mode and the triplet photons signal mode. Once phase matching and energy conservation are satisfied, the efficiency of TOSPDC can be determined by effective nonlinearity given by the following relation:

$$\gamma = \frac{3\chi^{(3)}\omega_p}{4\varepsilon_0 c^2 n^2}\eta \quad \text{Eq. (29)}$$

where n is the refractive index of the material forming the waveguide, $\chi^{(3)}$ is the effective third order susceptibility at the pump frequency, c is the speed of light, $\varepsilon_0$ is the vacuum permittivity, $\omega_p$ is the pump frequency. The parameter $\eta$ is defined as the sum of mode overlap components $$\eta_{ijkl} = [A_{eff}^{ijkl}]^{-1} = \iint E_p^{i*} E_s^j E_s^k E_s^l dxdy \quad \text{Eq. (30)}$$

between pump and signal electric field components corresponding to all non-zero susceptibility tensor elements $\chi_{ijkl}^{(3)}$, where the subscript p denotes electric field components associated with the pump mode and the subscript s denotes electric components associated with the signal mode. The non-zero tensor elements are determined by the material crystal structure and orientation.

In some embodiments, the effective interaction area $A_{eff}$ can be, for example, in a range of about $10^{-9}$ m$^2$ to about $10^{-11}$ m$^2$.

In many embodiments, a significant part of the field in a nanoscale waveguide according to the present teachings is in the form of evanescent modes. As such, the components of the mode profile that propagate in the waveguide core and cladding should be considered independently and the corresponding nonlinear tensors should be utilized.

By way of further illustration, in some cases, the bandwidth of a triplet photon signal can be estimated by assuming that the pump frequency is blue detuned (for normal mode dispersion) from the perfect phase match point. The momentum of the pump and signal photons can be described near the phase match point via Taylor expansion. It is found that such an expansion leads to highly accurate results even for signal spans of several hundred nanometers, although in some cases frequency dependent dispersion data can also be used to obtain more accurate results. The results of such expansion for the pump photon and triplet signal photons are given below by relations (31) and (32), respectively. Since the triplet photon signal is generated in a single mode, the same dispersion parameters are used for all of the three signal photons.

$$k_p = k_{p0} + \frac{\delta k_{p0}}{\delta\omega}(\omega_p - \omega_{p0}) + \frac{1}{2}\frac{\delta^2 k_{p0}}{\delta\omega^2}(\omega_p - \omega_{p0})^2 \quad \text{Eq. (31)}$$

Where $k_p$ is the wavenumber at the detuned pump frequency, $k_{p0}$ is the wavenumber for the pump at perfect phase matching, $\omega_{p0}$ is the pump frequency at perfect phase matching, $\omega_p$ is the detuned pump frequency, $$\frac{\delta k_p}{\delta\omega} = \frac{1}{v_{g,p}}$$

is evaluated at $\omega_p = \omega_{p0}$ and $$\frac{\delta^2 k_p}{\delta\omega^2}$$

is the group velocity dispersion evaluated at $\omega_p = \omega_{p0}$.

$$k_s = k_{s0} + \frac{\delta k_s}{\delta\omega}(\omega_s - \omega_{s0}) + \frac{1}{2}\frac{\delta^2 k_s}{\delta\omega^2}(\omega_s - \omega_{s0})^2 \quad \text{Eq. (32)}$$

where $k_p$ and $k_s$ denote the momentum of the pump and signal photons, respectively, and $\omega_{p0}$ and $\omega_{s0}$ denote the perfectly phase matched pump and signal frequencies, and the other parameters are defined as noted above.

Figure 24:
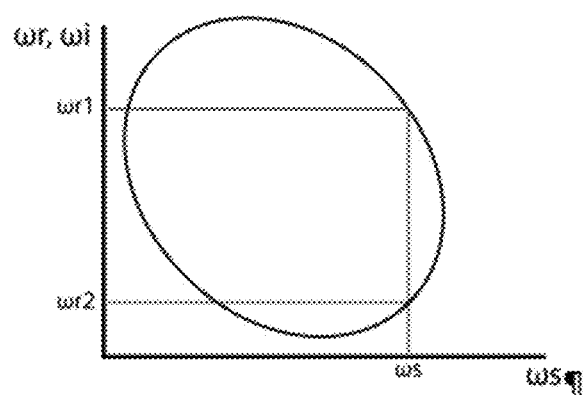
FIG. 24 is a frequency-frequency plot in the form of an ellipse corresponding to the solutions for the three signal photon frequencies in a case in which the pump radiation is detuned relative to a perfect phase matching frequency.

The solutions for the three signal photon frequencies plotted on a frequency-frequency plot forms an ellipse, as shown in FIG. 24. The photon energies of the three photons in a photon triplet can be visualized by selecting a frequency on the x-axis (or y-axis) and drawing a line through the ellipse. The intercept points represent the photon frequencies. For example, solving for two of the triplet photon frequencies ($\omega_{r1}$, $\omega_{r2}$) in terms of the pump photon frequency ($\omega_p$) and the frequency of the other triplet photon ($\omega_s$) yields the following relation:

$$\omega_r(\omega_p, \omega_s) = \frac{k_s'' \omega_p - k_s'' \omega_s}{2k_s''} \pm \qquad \text{Eq. (33)}$$

$$\frac{\sqrt{3}}{6k_s''} \sqrt{k_s'' \begin{pmatrix} 6k_p'' \omega_p^2 - 3k_s'' \omega_p^2 + 12k_p'(\omega_p - \omega_{p0}) - \\ 12k_p'' \omega_p \omega_{p0} + 4k_s'' \omega_p \omega_{p0} + 6k_p'' \omega_{p0}^2 - 2k_s'' \omega_{p0}^2 - \\ 12k_s'(\omega_p - \omega_{p0}) + 6k_s'' \omega_p \omega_s - 9k_s'' \omega_s^2 \end{pmatrix}}$$

where $k_s'$ and $k_p'$ are the first derivative (inverse group velocity, $$k' = \frac{\delta k}{\delta \omega} = \frac{1}{v_g})$$

of signal and pump wavenumber with respect to the frequencies $\omega_s$ and $\omega_p$, respectively, and $k_s''$ and $k_p''$ are the second derivative $$k'' = \frac{\delta^2 k}{\delta \omega^2}$$

(group velocity dispersion) evaluated at frequencies $\omega_s$ and $\omega_p$.

The two solutions to the square root in the above Eq. (33) provide the two frequencies in the top and bottom halves of the ellipse.

The maximum and the minimum frequencies of $\omega_s$ are given by the following relation:

$$\omega_s = \qquad \text{Eq. (34)}$$

$$\frac{\omega_p}{3} \pm \frac{\sqrt{2}}{3k_s''} \sqrt{k_s''(6k_p' - 6k_s' + (3k_p'' - k_s'')(\omega_p - \omega_{p0}))(\omega_p - \omega_{p0})}$$

where $k_s'$ and $k_p'$ are the first derivative of signal and pump wavenumber with respect to the frequencies $\omega_s$ and $\omega_p$, respectively, and $k_s''$ and $k_p''$ are the second derivative.

Using the last two equations, one can calculate the maximum span of $\omega_s$ and the frequencies of all three signal photons in a triplet for any given frequency $\omega_s$ within that span as follows:

$$\omega_{s,span} = \qquad \text{Eq. (35)}$$

$$\frac{2\sqrt{2}}{3k_s''} \sqrt{k_s''(6k_p' - 6k_s' + (3k_p'' - k_s'')(\omega_p - \omega_{p0}))(\omega_p - \omega_{p0})}$$

$$\omega_{s,span} = \qquad \text{Eq. (36)}$$

$$\sqrt{\left(\frac{8}{9k_s''^2}\right) k_s'' \left(\frac{6k_p' - 6k_s' + (3k_p'' - k_s'')}{(\omega_p - \omega_{p0})}\right)(\omega_p - \omega_{p0}) + \frac{4\pi}{L'|k_s''|}}$$

where $k_s'$ and $k_p'$ are the first derivative (inverse group velocity) of signal and pump wavenumber with respect to the frequencies $\omega_s$ and $\omega_p$, respectively, and $k_s''$ and $k_p''$ are the second derivative (group velocity dispersion), $\omega_p$ and $\omega_{p0}$ are the pump frequency and pump frequency at perfect phase matching, respectively, L' is the nonlinear interaction length between pump and signal. Eq. (35) gives an approximation of the signal span which does not take into account the finite or minimum signal bandwidth which results from a finite interaction length between the pump and signal modes. The last term in Eq. (36) accounts for the impact of finite minimum signal bandwidth (see Eq. (26)). As the interaction length between pump and signal becomes larger, Eq. (36) can be approximated more accurately by Eq. (35).

To optimize the generation of triplet photons, the phase mismatch $\Delta k$ for the desired combination of pump and signal frequencies should be minimized. Further, the effective nonlinearity parameter $\gamma$ should be maximized by choosing a waveguide geometry that would enhance the electric field overlap between the pump and signal modes. Moreover, the material forming the waveguide should be selected to exhibit a high $\chi^{(3)}$ coefficient, and preferably low fluorescence in response to pump radiation.

By way of illustration and without any loss of generality, the steps of a method for designing a waveguide for generating triplet photons according to the present teachings is discussed below by assuming that the waveguide is formed of $TiO_2$ and the pump radiation is at a wavelength of 532 nm at which high-power pump lasers with narrow bandwidth, high stability, and low cost are available. The teachings discussed herein can be extended to other wavelengths and material platforms depending, for example, on the desired signal photon wavelength and available pump laser wavelength.

Figure 25:
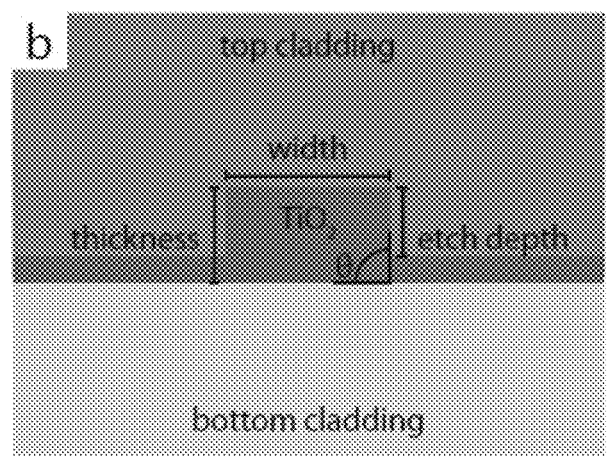
FIG. 25 schematically depicts some of the geometrical parameters of a waveguide, such as width, thickness, and etch depth, which can be adjusted according to the present teachings to optimize the generation and detection of entangled photon triplets via TOSPDC.
Figure 26A:
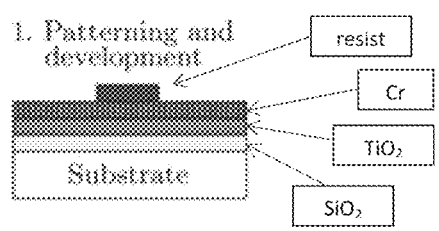
FIGS. 26A-26E schematically depict one set of steps which can be used for fabricating a $TiO_2$ strip waveguide. The last step includes coating the fabricated structure in an additional layer of $TiO_2$ to reduce losses introduced by fabrication imperfections.
Figure 26B:
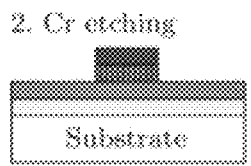
Figure 26C:
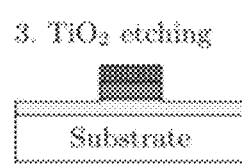
Figure 26D:
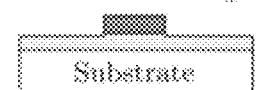
Figure 26E:
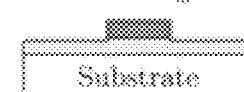

In this embodiment, the following design parameters can be considered: the waveguide core material (which is selected in this embodiment to be $TiO_2$), the material of bottom cladding, which can be the substrate on which the waveguide is disposed, the material of top cladding, waveguide width, waveguide height, etch depth, and the waveguide sidewall angle. FIG. 25 schematically depicts some of the geometrical parameters of the waveguide, such as width, thickness, and etch depth, which can be adjusted according to the present teachings to optimize the generation and detection of triplet photons via TOSPDC. Without loss of generality, the following discussion will be focused on a fully etched $TiO_2$ waveguide, and symmetric waveguide geometries with 90° sidewall angles. A commercial finite-difference eigenmode solver marketed by Lumerical Solutions, Inc. under the trade designation MODE Solutions was employed for the waveguide design. For a given waveguide geometry, all propagating modes and their respective dispersion properties at $\lambda_p$ and $3\lambda_p$ were calculated using measured materials properties of thermal oxide ($SiO_2$) and oxide ($SiO_2$) grown by chemical vapor deposition (CVD). These same techniques can be employed for other combinations of core and cladding materials. The calculated modal dispersion properties were then used to calculate the phase mismatch $\Delta k$ for all mode pairs consisting of visible pump and IR signal. The mode profiles and the $\chi^{(3)}$ nonlinearity of the core and the cladding materials were used to calculate the mode overlap and $\gamma$ for all mode pairs. This process was repeated for all device geometries to minimize the phase mismatch and maximize $\gamma$.

A plurality of rectangular waveguides were considered by varying the waveguide height in the range of 200 to 400 nm and the waveguide width in the range of 400 nm to 600 nm in steps of 5 nm. Interpolations can be used to access finer-resolution dispersion parameters and reduce the amount of time required for computationally intensive mode and dispersion calculations. This range of dimensions was chosen to ensure single mode operation at $3\lambda_p$, that is, only one TE mode and one TM guiding mode are supported by the waveguide at the signal wavelength of 1596 nm. A figure of merit (F), defined by the following relation, which describes the effective spectral density of signal photons, was employed for rapid assessment of the waveguide geometries:

$$F = \frac{\gamma^2}{\delta_s} \quad \text{Eq. (37)}$$

where $\gamma$ represents the effective nonlinearity, and $\delta_s$ represents the bandwidth of the triplet photons signal with minimum signal bandwidth $\min\{\delta_s\}=\Delta_{PPM}$, which is given by the PPM bandwidth in the above Eq. (26) for degenerate TOSPDC. For each set of waveguide dimensions, the mode pair (pump and signal) with the lowest phase mismatch and a non-zero effective nonlinearity was found. The optimal waveguide dimensions were then determined using maximum values of the figure-of-merit F. Choosing a region in the waveguide parameter space in which a high figure-of-merit is maintained for a large range of waveguide dimensions can reduce the negative impacts of fabrication tolerances on device performance. The above figure-of-merit can be used to optimize waveguide parameters other those discussed in this illustrative example.

Table 2 below shows waveguide parameters for phase-matching regions with a high figure-of-merit F ($e_s$ is the signal mode polarization, $\gamma$ is the effective nonlinearity, minimum signal bandwidth is calculated assuming a 2-mm interaction length, and the figure of merit is given based on this calculated minimum signal bandwidth).

TABLE 2

| $e_s$ | Width (nm) | Thickness (nm) | $\Gamma$ (W$^{-1}$km$^{-1}$) | $\Delta_{PPM}$ (µm) | F (W$^{-2}$m$^{-1}$µm$^{-1}$) |
|---|---|---|---|---|---|
| TE | 400-600 | 268-245 | 291-908 | 0.046-0.051 | 1.81-16.2 |
| TE | 400-600 | 322-346 | 233-718 | 0.044-0.062 | 1.22-11.6 |
| TM | 400-600 | 351-364 | 522-671 | 0.044-0.048 | 6.19-14.0 |

In some embodiments, a waveguide designed according to the present teachings can be dimensioned such that it would support the generation of direct triplet photons via TOSPDC, in response to illumination by pump radiation, such that the generated triplet photons reach the distal end of the waveguide (i.e., the end of the waveguide through which the triplet photons exit the waveguide) at a rate (in terms of the number of photons per second per pump power applied to the waveguide per waveguide length) in a range of about 0.01 to about 5 triplets/s/mW/mm, e.g., in a range of about 0.02 to about 1 triplets/s/mW/mm, or in a range of about 0.02 to about 0.5 triplets/s/mW/mm. In some cases, the generated triplet photons reach the distal end of the waveguide at a rate in a range of about 0.02 to about 0.1 triplets/s/mW/mm. For example, in some such embodiments, the waveguide is selected to be equal to or less than $L_{opt}$ defined by the above Eq. (24). In some embodiments, the waveguide length is selected to be equal to or less than $L_{opt}$ and equal to or greater than L defined by the above Eq. (26) with L'=L. The upper limit on the length of the waveguide provides the advantages discussed above, including improving the rate at which triplet photons reach the distal end of the waveguide and can be detected against a background of photons generated by other mechanisms, such as fluorescence. The lower limit on the length of the waveguide can lower, and preferably minimize, the spectral bandwidth of the generated triplet photons. The other dimensions of the waveguide, such as, width, etch fraction, and sidewall angle, can be determined in accordance with the above teachings, for example, to optimize the generation and detection of the triplet photons.

In some embodiments, the materials used for forming the waveguide, and particularly the waveguide's core, can be selected to be substantially transparent to the pump radiation, exhibit a high refractive index, high nonlinearity, and low fluorescence at the pump radiation wavelengths. By way of example, in some embodiments, rutile $TiO_2$ is used for forming the waveguide's core as rutile is a wide-bandgap semiconductor that exhibits a high refractive index, birefringence, and transparency for wavelengths greater than 400 nm. Rutile also has a large Kerr nonlinearity $n_2=9\times10^{-19}$ m$^2$/W. Rutile $TiO_2$ thin films have been shown to exhibit a higher index of refraction than anatase $TiO_2$, e.g., the index of refraction of anatase and rutile at 550 nm have been reported to be 2.6 and 2.72, respectively. High index contrast between the core and cladding better confines guided modes to the core and results in stronger optical nonlinearities. In addition, rutile is believed to have higher intrinsic optical nonlinearity. For example, bulk rutile has been reported to have a nonlinearity of $-8.6\times10^{-18}$ m$^2$/W for the ordinary axis and $-8.07\times10^{-18}$ m$^2$/W for the extraordinary axis at a wavelength of 532 nm. Anatase is expected to have a nonlinearity of $n_2=4.65\times10^{-19}$ m$^2$/W at 532 nm, based on the bandgap scaling method. Finally, single crystal films have lower losses than polycrystalline films, where grain boundaries lead to scattering. All of these properties are beneficial for guiding applications and integrated nonlinear nanophotonics.

Bulk rutile grown by the floating-zone technique is commercially available; however, thin film rutile $TiO_2$ for waveguiding applications has been more difficult to achieve. Current approaches include a variety of deposition techniques, such as reactive radio-frequency magnetron sputtering, atomic layer deposition (ALD), sol-gel, and ion-implantation methods.

Deposition conditions can be adjusted to optimize the growth of rutile films. This can include using substrates that are lattice matched to rutile $TiO_2$ (e.g. Sapphire), depositing the films at higher temperatures and annealing amorphous thin films. In RF sputtering, the deposition parameters can be adjusted to optimize the rutile phase growth (e.g., $O_2$ or Ar flow rate, pressure, temperature, choice of target (e.g., Ti vs. $TiO_2$), power, chamber size, rotation and distance between the target and substrate, etc).

Rutile has tetragonal (4/mmm) symmetry, with space group $P4_2/mnm-D_{4h}^{14}$ and unit cell parameters a=b=4.5937 and c=2.9581 Angstroms. Anatase $TiO_2$ also shares this symmetry, with space group $I4_1/amd-D_{4h}^{19}$ and unit cell parameters a=b=3.7842 and c=9.5146 Angstroms. Anatase may have a wider bandgap of 3.1-3.4 eV, whereas Rutile has been found to have a fundamental optical bandgap of 3.03 eV from absorption/photoluminescence spectroscopy experiments. Rutile is more thermally stable than anatase or amorphous $TiO_2$.

As an alternative to single crystal films, films with smaller crystal sizes can be used to decrease Rayleigh scattering, leading to lower propagation losses. Methods for achieving smaller crystallites include nanolaminate ALD (atomic layer deposition) films and nanoparticle-based thin films. Rayleigh scattering intensity is proportional to $\lambda^{-4}$ and $r^6$, where $\lambda$ is the wavelength and r is the radius. Therefore, a decrease in ½ of the crystal size decreases the scattering intensity by a factor of $2^6$=64. However, it is still desirable in many embodiments to employ anatase $TiO_2$ films as opposed to amorphous films, since photochromism effects in amorphous $TiO_2$ films may inhibit nonlinear nanophotonic applications.

As discussed above, the loss of photons in the waveguide can adversely affect the rate at which generated triplet photons reach the waveguide's output surface. Hence, it is desirable to minimize such photon losses in the waveguide. By way of example, atomic layer deposition (ALD) offers improved control over film thickness and crystallinity, which can in turn result in a higher refractive index when compared to other deposition methods and can lower waveguide losses. For example, ALD can be used to control the crystal phase of thin $TiO_2$ films. Rutile $TiO_2$ is expected to have a higher refractive index, lower losses and higher nonlinearity.

These properties can improve the device performance of TOSPDC in $TiO_2$ nanophotonic waveguides. In addition, ALD offers controlled growth since precursors are cycled through a chamber and purged, allowing for controlled deposition of 1 layer per cycle. Typical growth rates are around 0.1 nm/cycle. This increased control of the dimensions is beneficial for $TiO_2$ nanophotonic waveguides designed for TOSPDC according to the present teachings, since changes in the dimensions of these waveguides due to fabrication variations can degrade the performance of the device. The control of the film density, obtained from adjusting parameters such as pressure and temperature, translates into control of the refractive index of the film, which can be beneficial in conjunction with precise waveguide dimensions in designing phase-matched devices for TOSPDC. Additionally, a higher refractive index is beneficial for higher mode confinement in nanoscale waveguides, resulting in a higher triplet generation rate.

ALD has also been used to decrease photon scattering due to sidewall roughness of waveguide structures and mode leakage, both of which can contribute to propagation losses in waveguides. For example, Hayrinene et al. report in "Low-loss titanium dioxide strip waveguides fabricated by atomic layer deposition" published in J. Light. Technol., vol. 32, no. 2, pp. 208-212, January 2014, which is herein incorporated by reference in its entirety, that propagation losses in 450 nm×1 μm amorphous $TiO_2$ strip waveguides fabricated via ALD, e-beam lithography and ME were decreased from 5±0.5 dB/cm to 2.4±0.2 dB/cm at a wavelength of 1.55 μm by growing 30 nm of $TiO_2$ over the waveguide structures using ALD. The improvement in loss is attributed to smoothing of the sidewall roughness. This was confirmed by testing a 480 nm×1.06 μm reference waveguide fabricated in one step (no additional ALD growth after etching the film), where the dimensions were chosen to coincide with the final dimensions of the two-step fabricated waveguide. This reference film had higher losses of 7±0.7 dB/cm. The standard deviation of loss values also improved with additional ALD layers, indicating that the differences between waveguides became smaller after re-deposition.

By way of illustration, with reference to FIGS. 26A-26E, Hayrinene discloses fabricating a $TiO_2$ strip waveguide by first depositing a $TiO_2$ film on an oxidized silicon substrate using an ALD system and titanium tetrachloride and water as precursors. Subsequently, a layer of chromium can be deposited over the $TiO_2$ film using electron beam deposition. A negative resist can be applied and patterned, e.g., using an electron beam pattern generator, and the exposed resist can be developed. The dry etching of the chromium layer can be achieved using chlorine and oxygen based plasma etching process. After the etching process, the $TiO_2$ can be dry etched using, e.g., sulfur hexafluoride, oxygen and argon. At this point, the $TiO_2$ layer can be slightly over-etched, which can reduce the effect of re-deposition of an additional layer of $TiO_2$ on the field distribution near the interface between $TiO_2$ and $SiO_2$.

In many embodiments, the major contribution to propagation losses in structured dielectric waveguides is from Rayleigh scattering due to fabrication imperfections. This is evidenced by the extremely low losses (0.08 dB/m) or large quality factors ($10^8$) that can be achieved on-chip using etchless fabrication or atomically smoothed surfaces. In the telecommunication regime (i.e., $\lambda$=1550 nm), losses as low as 2.6 dB/m can be achieved using CMOS-compatible fabrication techniques. In the visible regime (i.e., $\lambda$=660 nm), propagation losses as low as 51 dB/m have been demonstrated. These two values are reasonably attainable in any transparent photonic platform given a high-quality epitaxially-grown thin film and an optimized, state-of-the-art etching recipe. Many procedures have been published on how to optimize a dry etch recipe in order to achieve smoother sidewalls and higher aspect ratios with the hopes of reducing optical losses. By way of example, the following articles, which are herein incorporated by reference in their entirety, provide information regarding suitable etching techniques: K. T. Vu and S. J. Madden, "Reactive ion etching of tellurite and chalcogenide waveguides using hydrogen, methane, and argon," *J. Vac. Sci. Technol. A Vacuum, Surfaces, Film*, vol. 29, no. 1, p. 011023, January 2011, S. Cheemalapati, M. Ladanov, J. Winskas, and A. Pyayt, "Optimization of dry etching parameters for fabrication of polysilicon waveguides with smooth sidewall using a capacitively coupled plasma reactor," *Appl. Opt.*, vol. 53, no. 25, pp. 5745-9, 2014, and S. K. S. Selvaraja, W. Bogaerts, D. Van Thourhout, and D. Van Thourhout, "Loss reduction in silicon nanophotonic waveguide micro-bends through etch profile improvement," *Opt. Commun.*, vol. 284, no. December, pp. 2141-2144, 2011.

In some embodiments, the rate at which the generated triplet photons reach the output facet of the waveguide can be (in the unit of number of photons per unit time per unit power) in a range of about 0.05 triplets/second/mW to about 0.3 triplets/second/mW, for example, in a range of about 0.05 triplets/second/mW to 0.1 triplets/second/mW, or in a range of about 0.1 triplets/second/mW to about 0.2 triplets/second/mW. In some embodiments, the losses in the waveguide can lead to predicted photon triplet generation rates on the order of 0.1 triplets/s/mW of pump power. This is an order of magnitude higher than the best experimental demonstrations to date based on cascaded SPDC and other predicted generation rates based on TOSPDC in silica fibers (even when losses are ignored in that system). However, fabrication improvements, including film deposition improvements, such as those discussed above can drastically decrease losses in integrated $TiO_2$ waveguides and may also increase the effective nonlinearity, leading to greatly increased predicted generation rates, e.g., as high as 0.3 triplets/second/mW or greater.

Table 3 below presents a comparison of estimated calculated photon triplet generation rates for different assumed loss and effective nonlinearity conditions for $TiO_2$ waveguides. The calculations are based on an assumed pump wavelength of 532 nm and expected $\chi^{(3)}$ values corresponding to $n_2$=4.65×$10^{-19}$ $m^2$/W. As stated above, fabrication process improvements have shown losses as low as 0.026 dB/cm at 1550 nm and as low as 0.51 dB/cm at 660 nm for waveguides fabricated in high-quality epitaxially-grown single crystal films. Due to increased losses at lower wavelengths due to Rayleigh scattering, the losses at 532 nm are expected to be higher (between 0.6-1 dB/cm). If epitaxially-grown rutile $TiO_2$ films exhibit higher nonlinearities, this could further increase the ideal photon triplet generation rates or help compensate for fabrication imperfections, which reduce conversion efficiencies. Note that increasing the effective nonlinearity by, for example, a factor of two will increase the photon triplet generation rate by a factor of four due to the square dependence of the conversion efficiency on effective nonlinearity.

TABLE 3

| | | | | |
|---|---|---|---|---|
| Signal loss (dB/cm) | | 8 | | 5.5 |
| Pump loss (dB/cm) | | 30 | | 15 |
| Ideal length (cm) | | 0.162 | | 0.276 |
| Effective nonlinearity (/W/km) | 600 | 1000 | 600 | 1000 |
| Triplet generation rate at output (triplets/s/mW) | 0.06 | 0.167 | 0.103 | 0.286 |

In Table 4 below, theoretical photon triplet generation rates are provided that could be achieved by implementing the growth of epitaxial, single-crystal $TiO_2$ films and state-of-the-art, CMOS compatible fabrication improvements to reduce sidewall and top surface roughness of the waveguides. The signal (infrared) and pump (visible) loss values can be achieved using fabrication optimization steps utilized in other epitaxial single-crystal materials.

TABLE 4

| | Ideal fab (low end) | | Ideal fab (high end) | |
|---|---|---|---|---|
| Signal loss (dB/cm) | | 0.026 | | 0.026 |
| Pump loss (dB/cm) | | 1 | | 0.6 |
| Ideal length (cm) | | 12 | | 17 |
| Effective nonlinearity (/W/km) | 600 | 1000 | 600 | 1000 |
| Rate at output (triplets/s/mW) | 3.55 | 9.87 | 5.42 | 15.1 |

In some embodiments, the waveguide's core has a polycrystalline structure with randomly oriented grains of diameters less than about 50 nm. In many such cases, the lack of long-range order and the small grain size allows treating the material as effectively isotropic. For example, in some embodiments, the waveguide's core can be formed of $TiO_2$, which is deposited on a thick thermal oxide, and is polycrystalline with randomly oriented grains of diameter smaller than 50 nm. By way of example, such a $TiO_2$ layer can be deposited on a thick thermal oxide.

In some embodiments, the optimization of the waveguide dimensions as discussed above, e.g., to optimize the generation of triplet photons, will also optimize entanglement of the triplet photons, e.g., the tripartite entanglement.

The following Examples are provided only for further illustration of the various aspects of the present teachings and the feasibility of their implementation and are not necessarily intended to indicate optimal ways of practicing the invention and/or optimal results that can be obtained.

Example 1

Submicrometer-wide waveguides were fabricated from 250-nm thick amorphous and anatase $TiO_2$ thin films, which were deposited on oxidized silicon substrates (3.2-micron thick $SiO_2$) at a substrate temperature of 290 K for amorphous $TiO_2$ and 625 K for anatase $TiO_2$ using reactive radio frequency (RF) magnetron sputtering. The oxygen flow rates and RF powers were adjusted to obtain stoichiometric, highly transparent $TiO_2$ thin films. The waveguide pattern was exposed into a 300-nm-thick positive electron-beam (e-beam) resist layer (ZEP-520a) on top of the $TiO_2$ film using a 125-keV electron-beam lithography system. The applied e-beam parameters included a 300×300 $\mu m^2$ write window, a beam current of 500 pA, and a dose of 400-600 $\mu C/cm^2$. After developing the exposed resist, a 50-nm-thick chromium film was deposited by e-beam evaporation and metal lift-off was performed to generate a metal etch mask. The metal pattern was transferred into the $TiO_2$ film using electron cyclotron resonance reactive ion etching. The etch parameters included a $CF_4$ and $H_2$ gas mixture in a ratio of 4:1, a microwave power of 235 W, a substrate power of 150 W, and a chamber pressure of 8.5 mTorr. The etch rate of the amorphous and anatase films was approximately 35 nm/min. After etching, the remaining metal mask was removed using Cr-etchant, and 3-4 $\mu m$ of Cytop fluoropolymer was deposited as a top-cladding layer. Finally, the chips were cleaved to prepare waveguide end-facets. In this manner, polycrystalline anatase $TiO_2$ waveguides with widths of 600 nm, 700 nm, 800 nm, and 900 nm were fabricated.

Figures 12A, 12B, 12C, 12D:
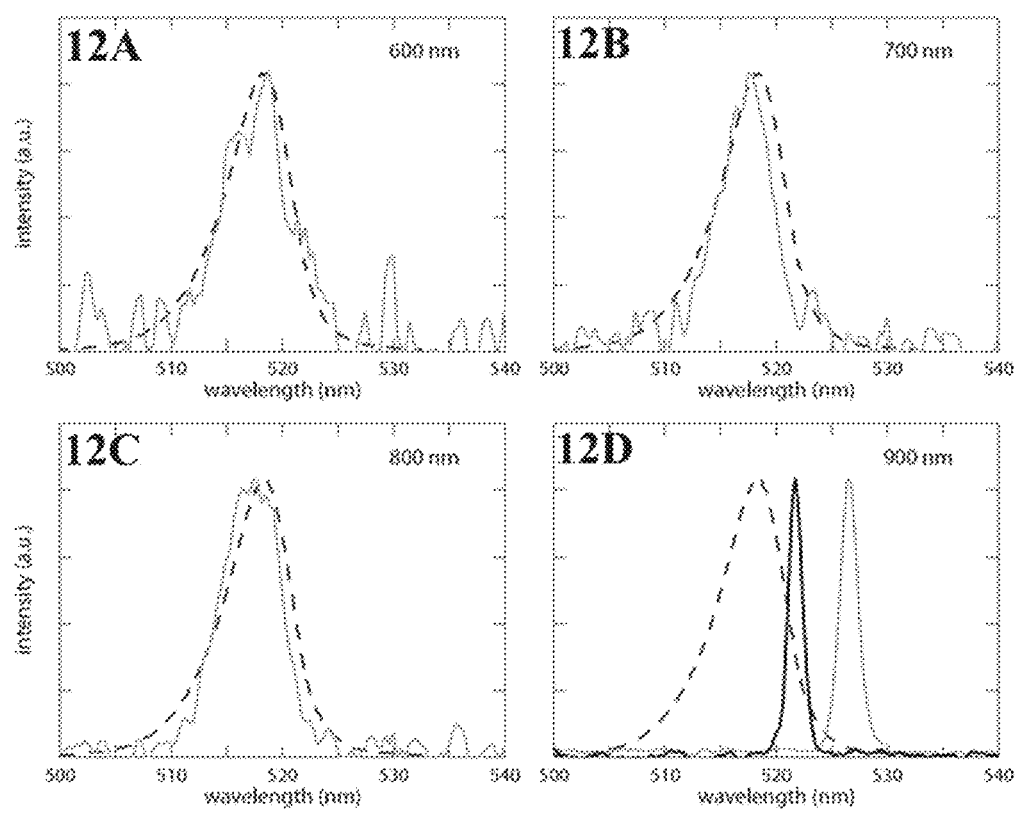
FIGS. 12A-12D show measured third-harmonic generation (THG, the opposite process of TOSPDC) spectra collected from waveguides fabricated from 250 nm thick polycrystalline anatase $TiO_2$ thin film with widths of 600, 700, 800, and 900 nm.

Using a pulsed pump laser centered at 1550-nm with 17-nm FWHM, $3^{rd}$ harmonic generation of light at 522-nm and 526-nm was observed in two different 900-nm waveguides as evidenced by a streak of green light. As shown in FIG. 12D, the corresponding spectrum of the emitted green light was narrow, which is consistent with phase matching between the fundamental pump mode around 1550 nm and a higher order signal mode in the visible. As shown in FIGS. 12A, 12B, and 12C, the remaining waveguides exhibited a broad, weak emission spectrum in the visible that closely followed the pump spectrum—a result consistent with non-phase-matched third harmonic generation (THG).

The dispersion of all modes in these waveguides was calculated using a finite-difference eigenmode solver. Given a TE-polarized pump beam, all possible phase matching points between the fundamental mode pump in the infrared and higher-order mode signal in the visible were considered. Candidate points near the bandwidth of the pump are shown in Table 5 below:

TABLE 5

| | 600 nm | | | 700 nm | |
|---|---|---|---|---|---|
| pump (nm) | 1519 | 1595 | 1633 | 1508 | 1621 |
| signal (nm) | 506.3 | 531.7 | 544 | 502.7 | 540.4 |
| γ ($W^{-1}km^{-1}$) | 42 | $<10^{-3}$ | 26.2 | $<10^{-12}$ | 31.1 |
| signal TE (%) | 89.6 | 12.8 | 37.5 | 65 | 11.4 |
| | 800 nm | | | 900 nm | |
| pump (nm) | 1501 | 1572 | 1594 | 1496 | 1565 | 1586 |
| signal (nm) | 500.2 | 523.9 | 531.4 | 498.5 | 521.7 | 528.8 |
| γ ($W^{-1}km^{-1}$) | $<10^{-12}$ | 13.4 | $<10^{-12}$ | $<10^{-8}$ | $<10^{-8}$ | 23.7 |
| signal TE (%) | 92.4 | 10 | 89 | 7.4 | 93.4 | 4.7 |

The only calculated phase matching points that fall within the pump bandwidth and has high modal overlap between pump and signal modes are in the 800-nm and 900-nm waveguides at 523.9 nm and 528.8 nm, respectively. Based on scanning electron microscope images of the waveguides, the actual dimensions are slightly different from the design dimensions. Taking these measured dimensions into account shifts the calculated phase matching point in the 800-nm waveguide out of the pump bandwidth and shifts the phase match point in the two 900-nm waveguides close to the observed third harmonic wavelengths at 522 and 526 nm. As seen in FIG. 7, slight fabrication differences can account for a shift of several nanometers in the phase matching point. In many embodiments, modal overlap of the pump and signal can be important for high conversion efficiency. This demonstrates a strong match between simulations and theory with experimental results of THG.

As the $3^{rd}$ harmonic generation (THG) of the 522-nm signal from a 1550-nm pump is the inverse of third order spontaneous parametric down-conversion, the above generation of THG shows the feasibility of a third-order down-conversion process in the $TiO_2$ waveguides since both processes rely on the same $\chi^{(3)}$ nonlinearity. Further, a signal near 1600 nm was observed when pumping the 900-nm waveguide with 532-nm light, and a signal near 1335 nm was observed when pumping the 900-nm waveguide with 445-nm light. Further, evidence of stimulated down-conversion was observed (a new spectral line appeared when pumping with both 1310-nm and 532-nm light). These observations are consistent with TOSPDC.

Example 2

In another example, the dispersion of a number of visible and infrared electromagnetic modes that can be sustained by a waveguide that was assumed to be formed of polycrystalline anatase $TiO_2$ thin film were theoretically modeled as a function of certain geometric parameters of the waveguide. The waveguide was assumed to have a cross-sectional shape characterized by a thickness (t), a width (w), and sidewall angle. The sidewalls of the waveguide were slightly sloped with a sidewall angle fixed at 75 degrees. The dispersion curves associated with the modes were calculated as a function of different values of the waveguide's width and thickness. For example, the top width of the waveguide was varied from 600 nm to 700 nm in 10 nm increments.

Figure 13:
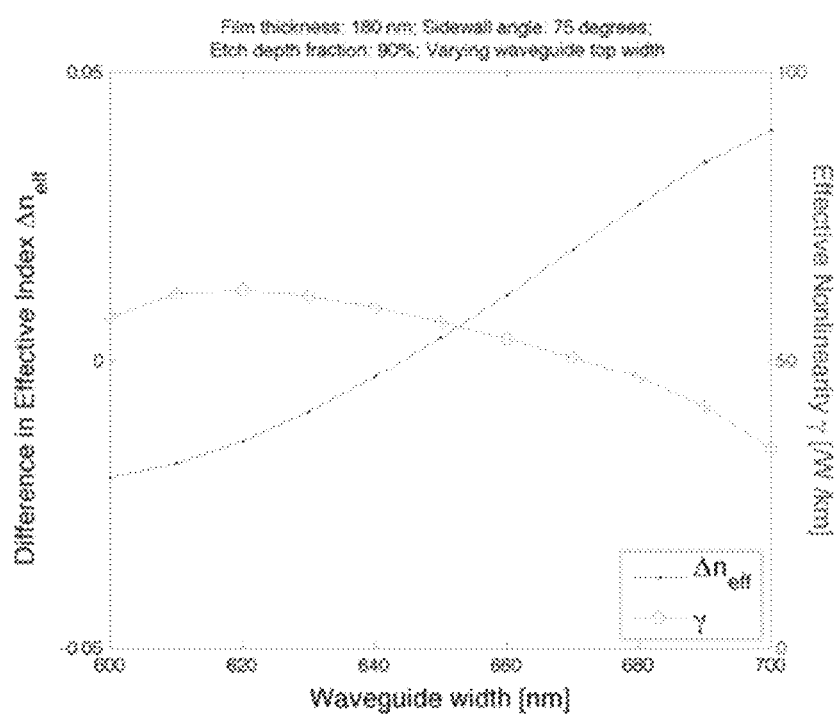
FIG. 13 shows one example of tuning the waveguide width to optimize phase matching and modal overlap between the pump and signal modes.

By way of example, FIG. 13 shows how changing a dimension of the waveguide, the waveguide width, can tune the properties of the device. Specifically, the simulation in FIG. 13 shows both the difference in effective index between the higher order pump mode in the visible and the fundamental signal mode in the infrared, and the effective nonlinearity of the TOSPDC process due to the overlap between these two modes, as a function of varying waveguide width and for a thickness of the waveguide (i.e., thickness of 180 nm). The sidewall angles were fixed at 75 degrees, and it was assumed that 90% of the slab surrounding the waveguide was etched (i.e., etch depth fraction of 90%).

FIG. 13 shows that there exists a "phase matching point" at a waveguide width of about 650 nm. By sweeping through different waveguide widths, it was observed that for smaller widths (starting at 600 nm), the difference in effective index is negative and there is no phase matching yet. As the waveguide width is increased, perfect phase matching is achieved at a width of 648 nm, and then the difference in effective index slowly increases again. Throughout this whole region, there is a relatively large effective nonlinearity γ (i.e. modal overlap), peaking at about 60/W/km. This shows that a waveguide with a width of about 650 nm would be phase matched with a large effective nonlinearity, making for an excellent triplet source.

A device having a polycrystalline anatase $TiO_2$ thin film with 180 nm thickness was fabricated. The film was deposited on a silicon wafer, with thermal oxide (the under-cladding of the device) having a thickness of 3 micrometers. CVD oxide ($SiO_2$) was utilized as the top cladding. For a waveguide width of about 650 nm, etch fraction of 0.9, and sidewall angle of 75 degrees, phase matching between visible mode 10 and infrared mode 1 at 532 nm was achieved with an effective nonlinearity of about 58/W/km, as shown in FIG. 13.

Figure 14A:
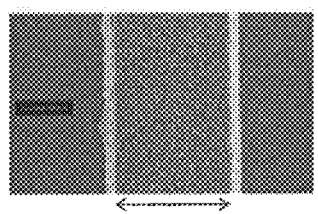
FIGS. 14A-14C show scanning electron microscope images (SEM, top view) of fabricated $TiO_2$ waveguides.
Figure 14B:
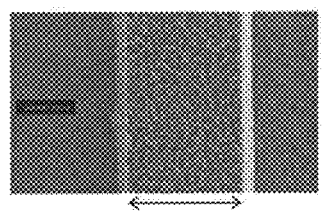
Figure 14C:
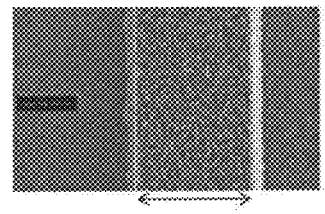
Figure 15:
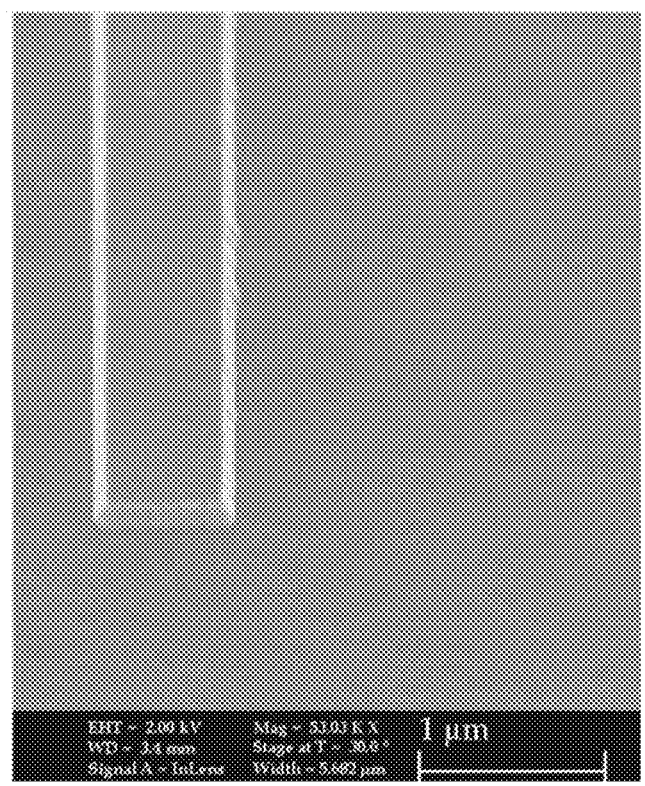
FIG. 15 is an image of a fabricated waveguide taken at 45 degrees to show the aspect ratio.

FIG. 14 shows various waveguides fabricated with dimensions dictated by these design sweeps. Specifically, multiple scanning electron microscope images show $TiO_2$ waveguides fabricated with the 'optimal' dimensions as described above in relation with the sweeps in FIG. 13. FIG. 14A shows an image of a waveguide having a thickness of 180 nm, sidewall angle of 75 degrees and a width of 657.5 nm as indicated by the vertical cursor width and arrow. FIG. 14B shows an image of a waveguide having a thickness of 180 nm, sidewall angle of 75 degrees and a width of 654.2 nm as indicated by the vertical cursor width and arrow. FIG. 14C shows an image of a waveguide having a thickness of 180 nm, sidewall angle of 75 degrees and a width of 649.1 nm as indicated by the vertical cursor width and arrow. FIG. 15 shows an image of one of the waveguides in FIG. 14, where the image is taken at 45 degrees to show the aspect ratio.

Example 3

Figures 16A, 16B:
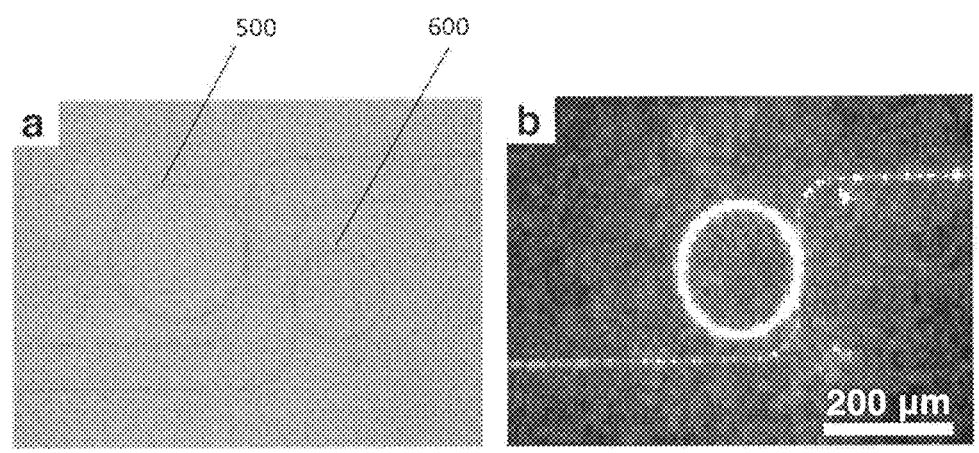
FIG. 16A and FIG. 16B show micro-ring resonators fabricated of polycrystalline anatase $TiO_2$, top view SEM and optical microscope image (showing light propagation within the ring).

Micro-ring resonators with diameters down to 200 μm and demonstrated Q-factors of up to 20,000 were fabricated in integrated polycrystalline anatase $TiO_2$ waveguides and propagation losses of 4-6 dB/cm in the telecommunication band were measured. FIG. 16A shows a pair of micro-ring resonators 500 and 600 fabricated of polycrystalline anatase $TiO_2$. The micro-resonator 500 has a diameter of 300 μm, and the micro-resonator 600 has a diameter of 200 μm. FIG. 16B shows the micro-resonator 500 of FIG. 16A, having a resonance around 1550 nm.

Figure 17:
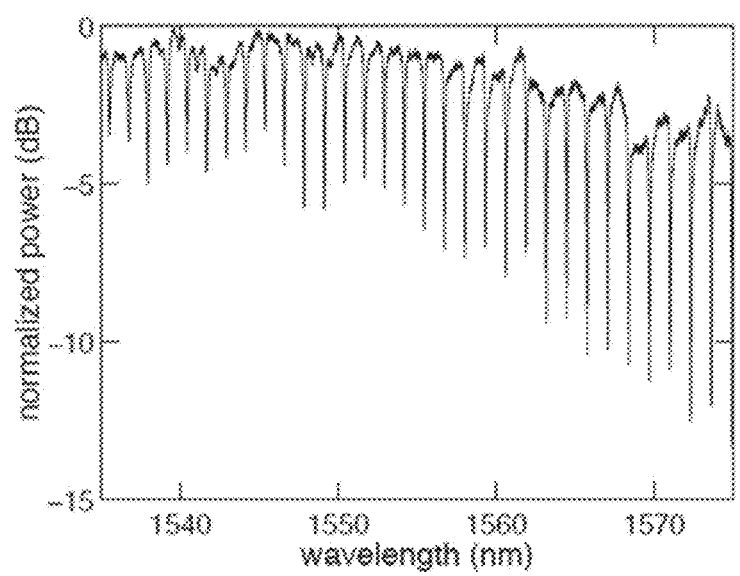
FIG. 17 shows a transmission spectrum of an integrated $TiO_2$ ring resonator device with dips corresponding to the resonances of the device.
Figure 18:
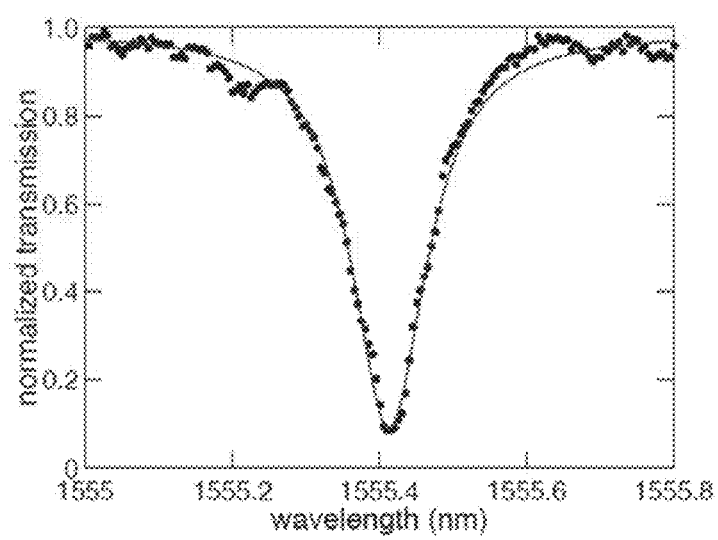
FIG. 18 shows fitting to the normalized transmission of one of the resonances in FIG. 17.

FIG. 17 shows a sweep of resonances in an integrated $TiO_2$ ring resonator device. Specifically, the plot shows normalized transmitted power spectrum of a ring resonator with a diameter of 300 μm. Many dips corresponding to the many resonances available in the ring may be observed, with the highest Q factors at about 20,000. FIG. 18 shows the normalized transmission of one of these resonances yields losses of down to 4 dB/cm.

Example 4

Third harmonic generation (THG) was observed in a waveguide formed according to the present teachings. Specifically, a nanoscale polycrystalline anatase $TiO_2$ waveguide (780×244 nm) was designed to have multiple phase-match points within TE-polarized pump bandwidth. This waveguide had a thermal $SiO_2$ bottom cladding and CYTOP fluoropolymer top cladding. The effective nonlinearity parameter γ was calculated to be 253 and 304 $W^{-1}$ $km^{-1}$ at 513.3 and 523.0 nm, respectively. The waveguide was formed using fabrication methods described in Bradley et al.

Figures 27A, 27B:
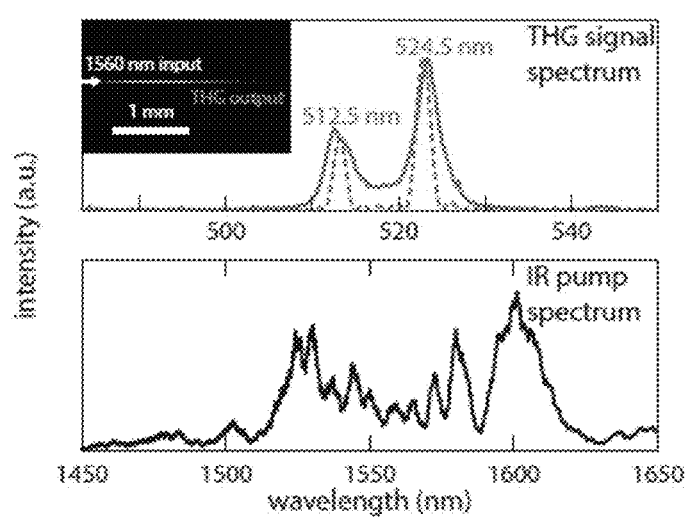
FIG. 27A shows the spectrum of IR pump radiation employed for generating THG in an exemplary illustration.
FIG. 27B shows calculated THG signal generated in response to application of the pump radiation having the spectrum shown in FIG. 27A (dashed curved), and measured THG signal (solid curve), indicating close agreement between the calculated and measured signals.

FIG. 27A shows the spectrum of the IR pump radiation utilized for THG. The dashed curve in FIG. 27B shows the calculated THG signal generated in response to application of the pump radiation, and the solid curve shows the measured THG signal, indicating close agreement between the calculated and measured signals. The experimental phase match points are within 1.5 nm of the calculated phase match points and the measured THG signal is broader than the calculated signal by approximately 3 nm. This variation can be due to variations in the waveguide width (e.g., about ±5 nm) and variations in the waveguide thickness along the length of the waveguide (e.g., about ±2 nm). These variations are within the fabrication tolerances of the waveguide width and roughness of the film used to fabricate the waveguide.

Example 5

By way of illustration, the optical losses in a polycrystalline anatase $TiO_2$ waveguide can be estimated to be in a range of about 20-30 dB/cm at a wavelength of 523 nm. The above Eq. (24) can be employed to obtain an ideal waveguide length of 2.2-2.8 mm, which can lead to a maximum photon triplet generation rate in a range of about 130-160 triplets/second. This rate takes into account an optimal end-fire coupling efficiency of 20.6% calculated for a 550× 360 nm waveguide and higher-order pump mode described above in connection with FIG. 22, and an input pump power of 1250 mW at 532 nm, corresponding to an estimate of the damage threshold of the waveguide, and a nonlinear index of $n_2=4.65\times10^{-19}$ $m^2$/W. It is expected that by optimizing fabrication, the losses can be lowered (e.g., as low as 3 dB/cm for the telecommunications wavelengths and 15 dB/cm for the visible wavelengths), which would allow increasing the optimal waveguide length to 3.7 mm and maximum triplet generation rate to 210 triplets/s or 0.17 triplets/s/mW of pump power.

Various publications referenced herein are hereby incorporated by reference in their entirety. Those having ordinary skill in the art will appreciate that various changes can be made to the above embodiments without departing from the scope of the invention.

The invention claimed is:

1. A device for generating triplet photons, comprising:
a waveguide comprising a core and at least one cladding and extending from a proximal end for receiving pump radiation to a distal end through which triplet photons generated via nonlinear interaction of the pump radiation within the waveguide exit the waveguide, wherein the waveguide is configured such that the triplet photons are generated within the waveguide and reach said distal end at a rate in a range of about 0.05 triplet photons/second/mW and 0.3 triplets/second/mW,
wherein said length of the waveguide is equal to or less than ($L_{opt}$) defined by the following relation:
wherein $\alpha_p$ and $\alpha_s$ denote loss coefficients for the pump radiation photons and the triplet photons within said waveguide, respectively.

2. The device of claim 1, wherein said rate is in a range of about 1 triplet photons/second/mW to about 0.2 triplet photons/second/mW.

3. The device of claim 1, wherein said waveguide is configured to provide phase matching between at least one propagating mode of said pump radiation and at least one propagating mode suitable for generation of said triplet photons.

4. The device of claim 3, wherein said waveguide is configured to provide phase matching between a higher-order propagating mode of said pump radiation and at least one mode suitable for propagation of said triplet photons.

5. The device of claim 1, wherein said waveguide exhibits values of core and cladding thickness, height, etch fraction, sidewall angle and length that result in the waveguide supporting said rate for the triplet photons generated within the waveguide that reach its distal end.

6. The device of claim 5, wherein any of said thickness and height are in the range of about 100 nm to about 2000 nm, fully etched fraction is in the range of 0.25 to 1 (fully etched), sidewall angle is in the range of 45-degrees to 90-degrees (vertical sidewalls) and length is in range of about 100 μm to about 10 cm.

7. The device of claim 1, wherein said waveguide core comprises any of anatase $TiO_2$, amorphous $TiO_2$, brookite $TiO_2$, silicon nitride, diamond, silicon nitride, silicon carbide, strontium titanate, or zinc oxide.

8. The device of claim 7, wherein said waveguide core comprises rutile $TiO_2$.

9. The device of claim 1, wherein said at least one cladding comprises any of $SiO_2$, CYTOP, SU-8, a low-index polymer, aluminum oxide, sapphire, air or vacuum.

10. The device of claim 1, wherein said waveguide core comprises a polycrystalline material.

11. The device of claim 10, wherein said polycrystalline material has grain sizes less than about 50 nm.

12. The device of claim 1, wherein said polycrystalline material has grains having a size of about $\frac{1}{5}^{th}$ of the pump wavelength.

13. The device of claim 1, wherein said waveguide has a non-circular cross section.

14. The device of claim 13, wherein said waveguide has a rectangular or trapezoidal cross section.

15. The device of claim 1, wherein said waveguide comprises a ring resonator.

16. A device for generating triplet photons, comprising
a waveguide extending from a proximal end for receiving pump radiation to a distal end through which triplet photons generated via nonlinear interaction of the pump radiation within the waveguide exit the waveguide,
wherein the waveguide is configured such that the triplet photons are generated within the waveguide and reach said distal end at a rate in a range of about 0.05 triplet photons/second/mW and 0.3 triplet photons/second/mW,
wherein said waveguide length is greater than a length ($L_{min}$) satisfying the following relation:

$$\Delta_{PPM} = \sqrt{\frac{4\pi}{L_{min}|D_s|}}$$

wherein $\lambda_{PPM}$ denotes the bandwidth of triplet photons at a phase matching point and $$D_s = \frac{\partial^2 k_s}{\partial^2 \omega_s}$$

evaluated at $\omega_s=\omega_s^0$ is group velocity dispersion (GVD) of the triplet photons at the phase matching point.

17. The device of claim 16, wherein said waveguide comprises a core and at least one cladding.

18. The device of claim 17, wherein said waveguide core comprises any of anatase $TiO_2$, amorphous $TiO_2$, brookite $TiO_2$, silicon nitride, diamond, silicon carbide, strontium titanate, or zinc oxide.

19. The device of claim 17, wherein said waveguide core comprises rutile $TiO_2$.

20. The device of claim 17, wherein said cladding comprises any of SiO$_2$, CYTOP, SU-8, a low-index polymer, aluminum oxide, sapphire, air or vacuum.

21. The device of claim 17, wherein said waveguide core comprises a polycrystalline material.

22. The device of claim 21, wherein said polycrystalline material has grain sizes less than about 50 nm.

23. A method of generating direct triplet photons, comprising
introducing pump radiation into a waveguide configured to provide phase matching between a higher order mode of said pump radiation and at least one mode suitable for propagation of direct triplet photons generated as a result of a non-linear interaction between the pump radiation and the waveguide,
wherein the waveguide is configured such that the triplet photons are generated within the waveguide and reach said distal end at a rate in a range of about 0.05 triplet photons/second/mW and 0.3 triplet photons/second/mW,
wherein a rate at which pump photons are applied to the waveguide is less than a threshold as defined by the following relation:

$$N_P < \sqrt{\frac{\rho_T}{\rho_{fl}^3 \Delta\tau_{correlation}^2}}$$

where $\rho_T$ and $\rho_{fl}$ represent, respectively, the rate at which pump photons are converted to photon triplets and fluorescence photons, and wherein $$\Delta\tau = GVD \times L \times \Delta\lambda_s$$

wherein GVD denotes the group velocity dispersion of the waveguide for the triplet photons propagation, L is the length of the waveguide, and $\Delta\lambda_s$ is the bandwidth associated with the triplet photons.

24. The device of claim 23, wherein said waveguide comprises a core and at least one cladding.

25. The device of claim 24, wherein said waveguide core comprises any of anatase TiO$_2$, amorphous TiO$_2$, brookite TiO$_2$, silicon nitride, diamond, silicon carbide, strontium titanate, or zinc oxide.

26. The device of claim 24, wherein said waveguide core comprises rutile TiO$_2$.

27. The device of claim 24, wherein said cladding comprises any of SiO$_2$, CYTOP, SU-8, a low-index polymer, aluminum oxide, sapphire, air or vacuum.

28. The device of claim 24, wherein said waveguide core comprises a polycrystalline material.

29. The device of claim 28, wherein said polycrystalline material has grain sizes less than about 50 nm.

\* \* \* \* \*